United States Patent [19]

King

[11] 4,292,788
[45] Oct. 6, 1981

[54] NUCLEAR FUEL ROD LOADING APPARATUS

[75] Inventor: Harold B. King, Wrightsville Beach, N.C.

[73] Assignee: General Electric Company, San Jose, Calif.

[21] Appl. No.: 120,231

[22] Filed: Feb. 11, 1980

[51] Int. Cl.³ .................... B65B 5/10; B65B 57/06; B65B 57/14

[52] U.S. Cl. ............................. 53/500; 53/148; 53/202; 53/244; 53/502; 53/505; 53/252; 53/542; 198/570; 414/748

[58] Field of Search ........... 53/244, 202, 252, 253, 53/148, 531, 532, 542, 475, 495, 497–500, 502, 505; 414/146, 748; 198/570, 737

[56] References Cited

U.S. PATENT DOCUMENTS

| | | | |
|---|---|---|---|
| 2,829,476 | 4/1958 | Engleson et al. | 53/532 |
| 3,500,984 | 3/1970 | Talbot | 53/532 X |
| 3,613,330 | 10/1971 | Voullaire | 53/475 X |
| 3,735,550 | 5/1973 | Moore et al. | 53/432 |
| 3,907,123 | 9/1975 | Howell | 53/531 X |
| 3,925,965 | 12/1975 | Rushworth | 53/167 |
| 3,940,908 | 3/1976 | Dazen et al. | 53/497 |
| 3,965,648 | 6/1976 | Tadesco | 53/244 X |
| 4,174,029 | 11/1979 | Kawaguchi et al. | 53/148 X |
| 4,235,066 | 11/1980 | King et al. | 53/500 |

*Primary Examiner*—James F. Coan
*Attorney, Agent, or Firm*—Ivor J. James, Jr.; Samuel E. Turner; Raymond G. Simkins

[57] ABSTRACT

An apparatus incorporating a microprocessor control is provided for automatically loading nuclear fuel pellets into fuel rods commonly used in nuclear reactor cores. The apparatus comprises first and second elongated members having "V" troughs for alternately receiving a plurality of fuel pellets to be loaded alternately in first and second fuel rods. The pellets are weighed while in the "V" trough of each elongated member and each elongated member is alternately relocated in axial alignment with a cooperating fuel rod. A guide bushing assembly is provided to assist the transfer of the pellets from each of the elongated members into awaiting fuel rods. A rod handling assembly incorporating rod handling means, a thumper assembly to facilitate the loading of fuel pellets into the fuel rods, an adjustable fuel rod backstop and a rod carousel carrying a plurality of fuel rods, presents two fuel rods to the guide bushing assembly at the appropriate stage in the loading sequence. Guide bushings in the guide bushing assembly are slidably actuatable for advancing to engage the fuel rods. The pellets are then loaded into the fuel rods by a motor operated push rod associated with each elongated member. As the pellets are pushed into the awaiting fuel rod, the thumper assembly is actuated to assist the loading operation. The guide bushing assembly includes photocells utilized in conjunction with the push rods to measure the length of the row of fuel pellets inserted into each fuel rod. Safeguards are provided to insure that the weight and position of the fuel pellets within the fuel rods fall within certain prescribed limits. After a segment of fuel pellets has been loaded, the guide bushing disengages from the loaded fuel rod, the rod carousel moves new rods into loading positions, and the entire loading operation is repeated.

22 Claims, 24 Drawing Figures

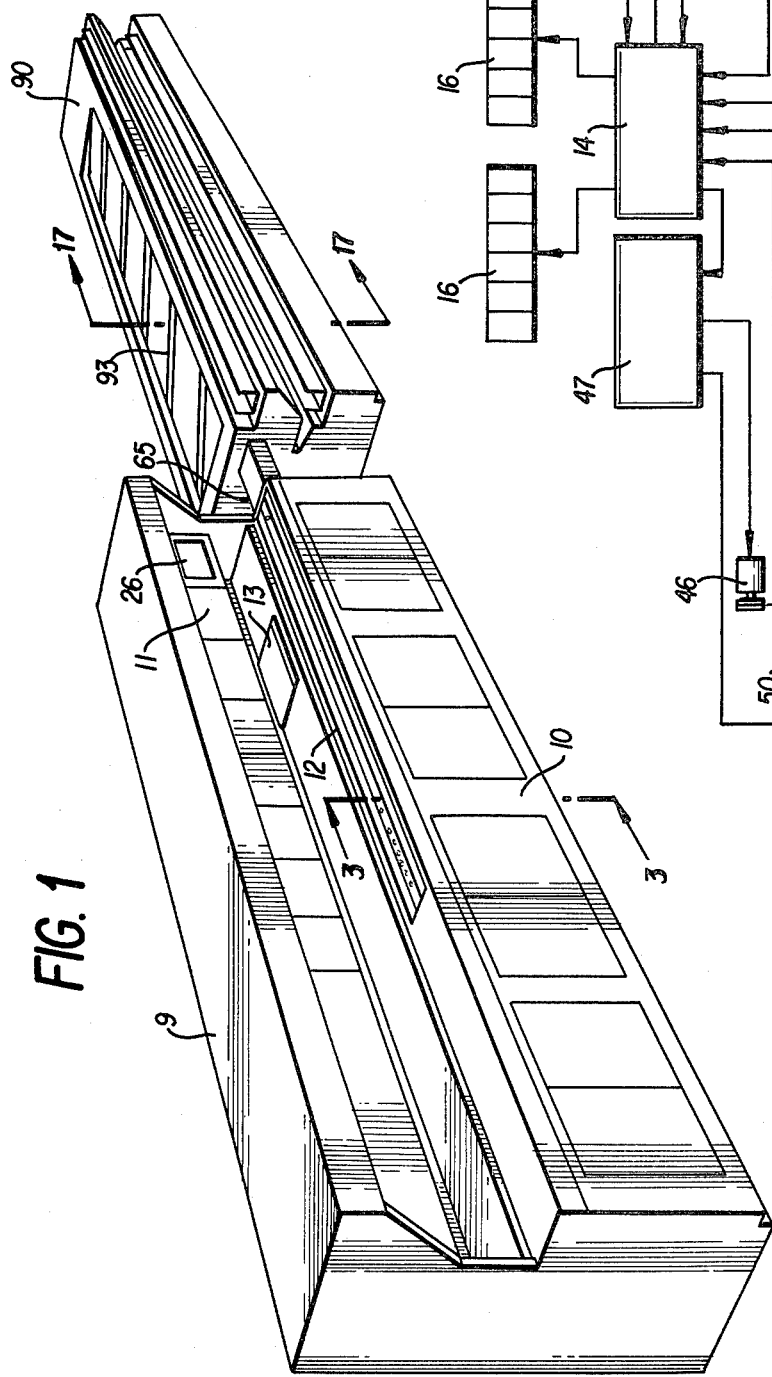
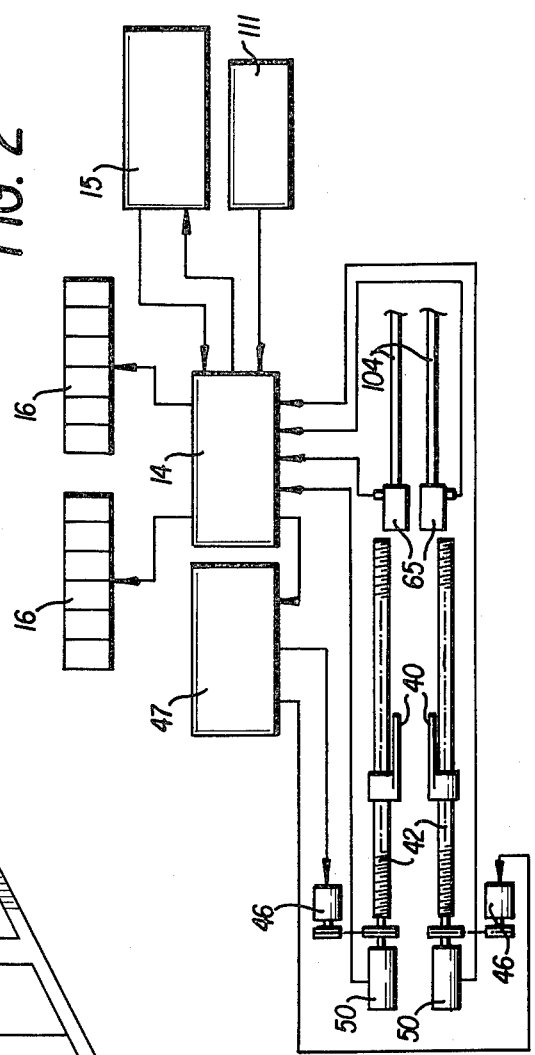
FIG. 1
FIG. 2

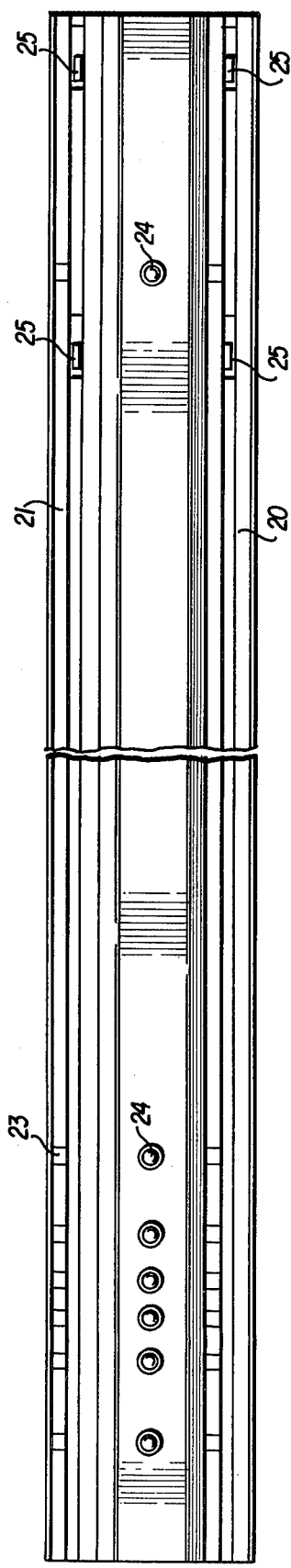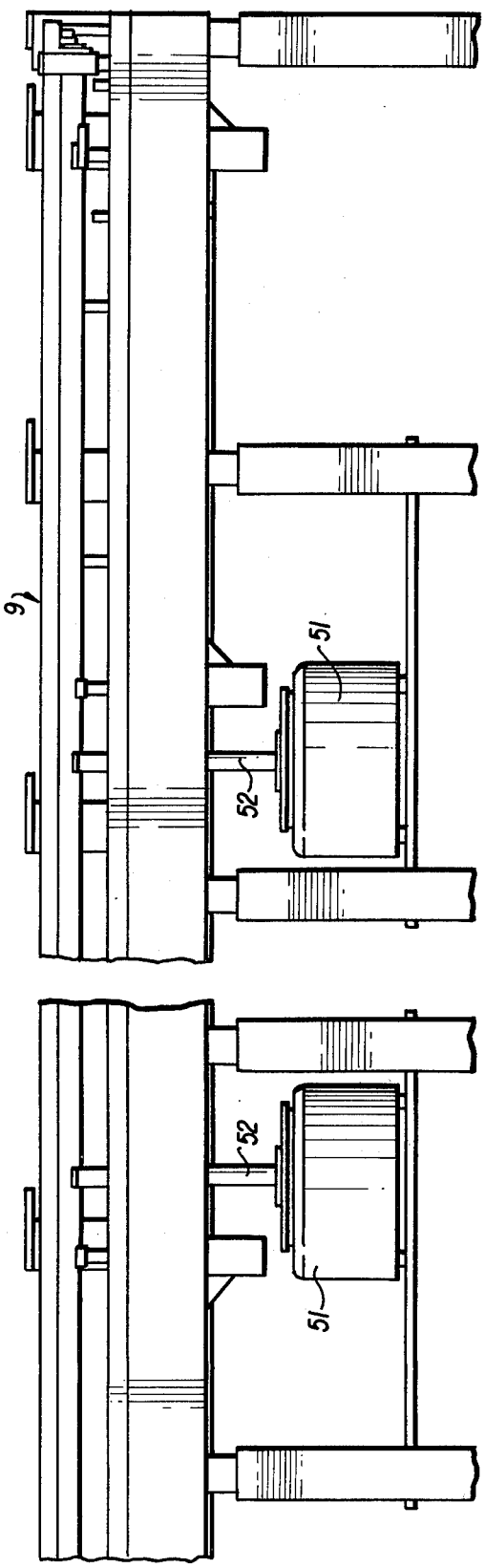

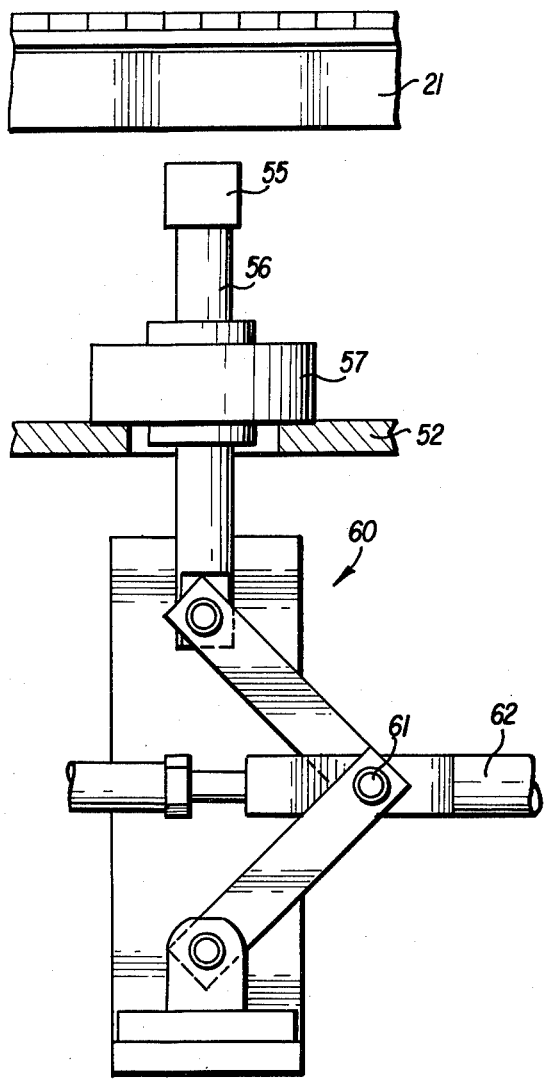
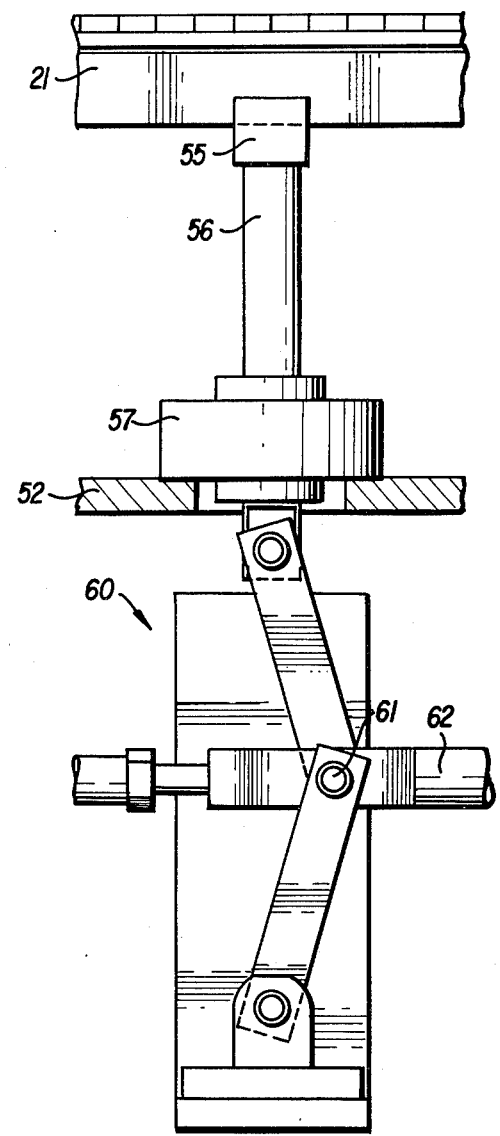
FIG. 9
FIG. 10

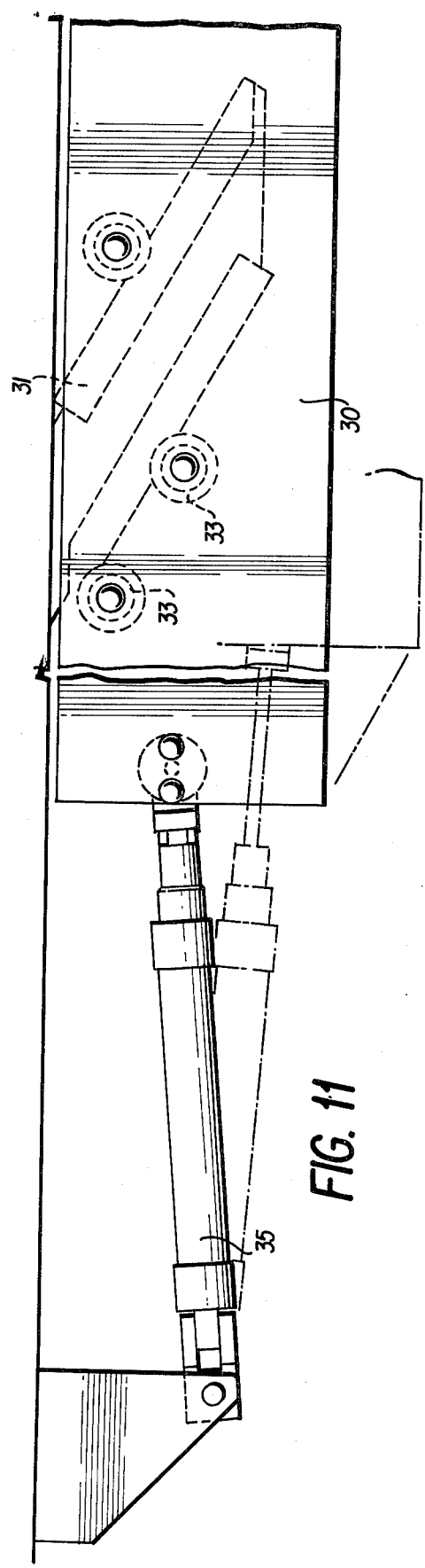
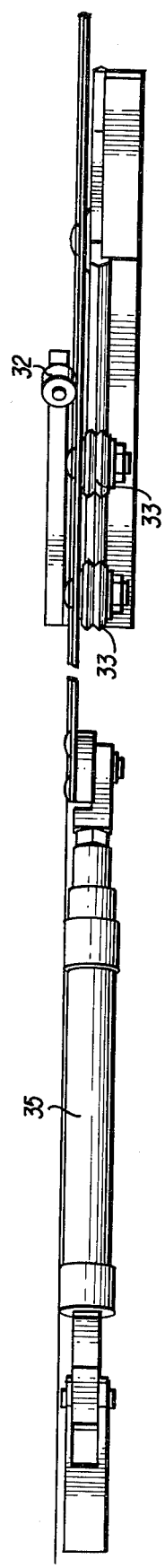
FIG. 11
FIG. 12

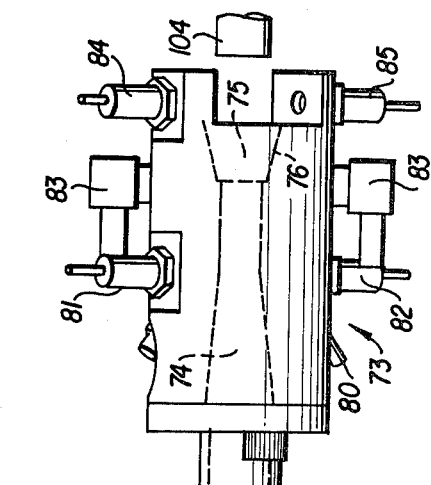
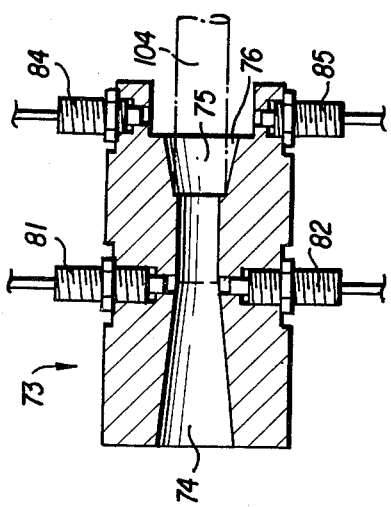
FIG. 15
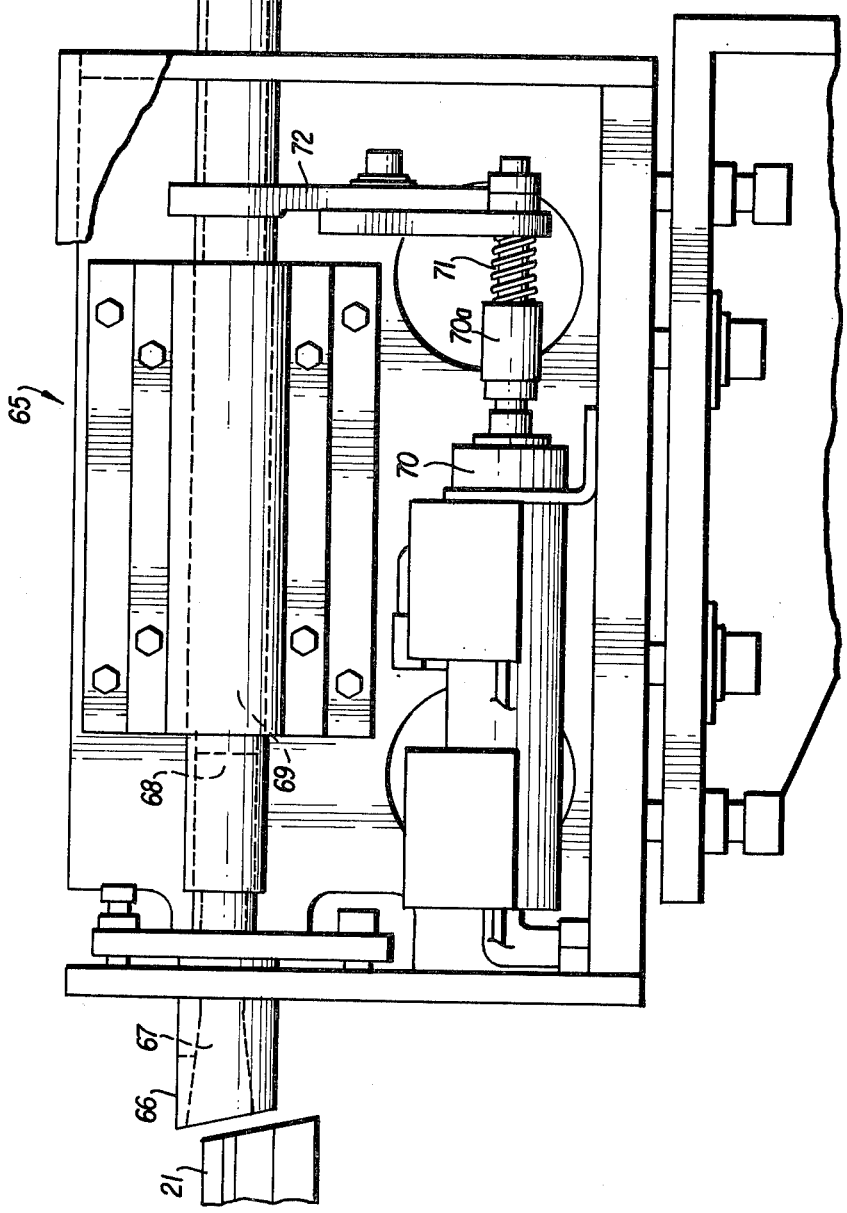
FIG. 14

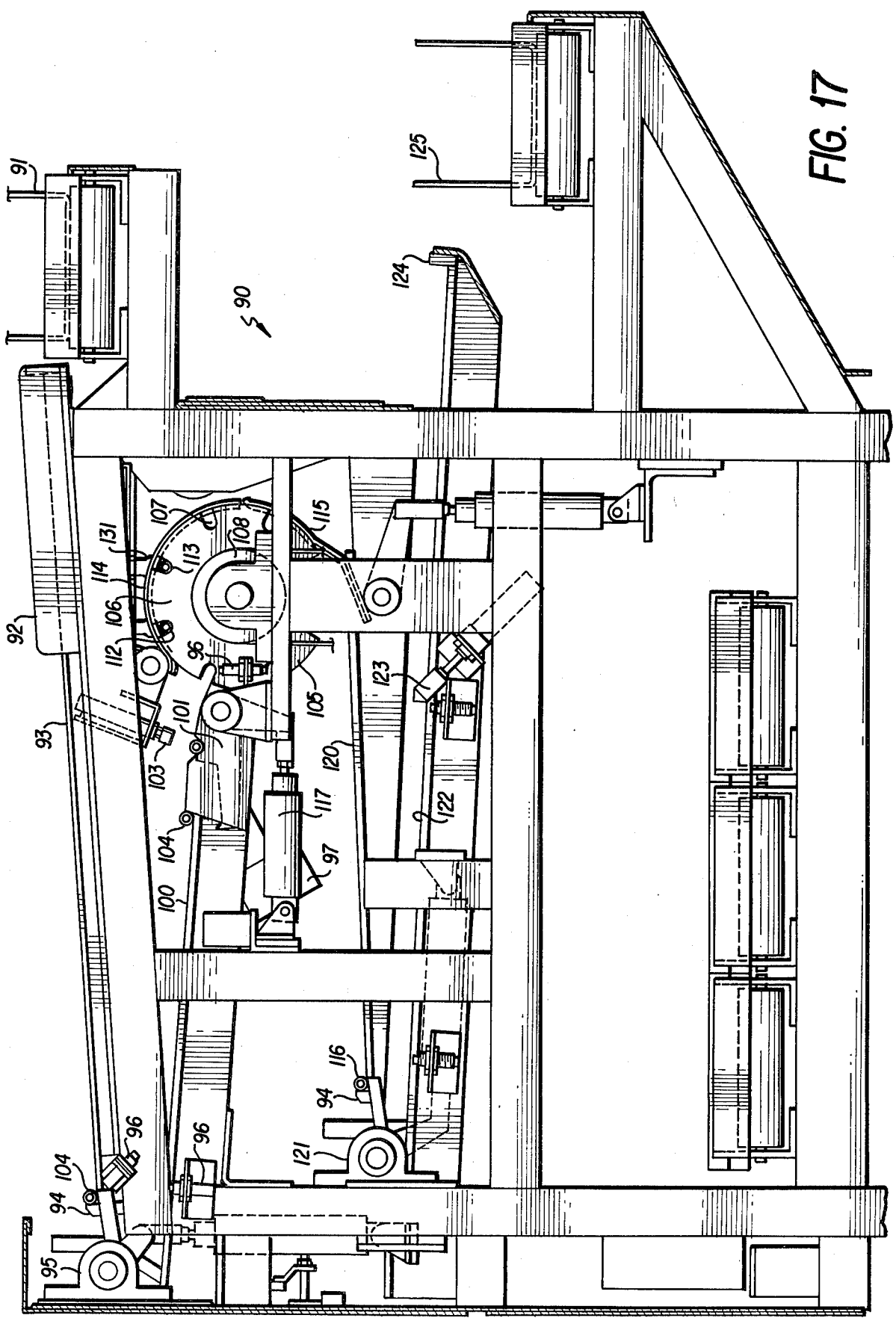

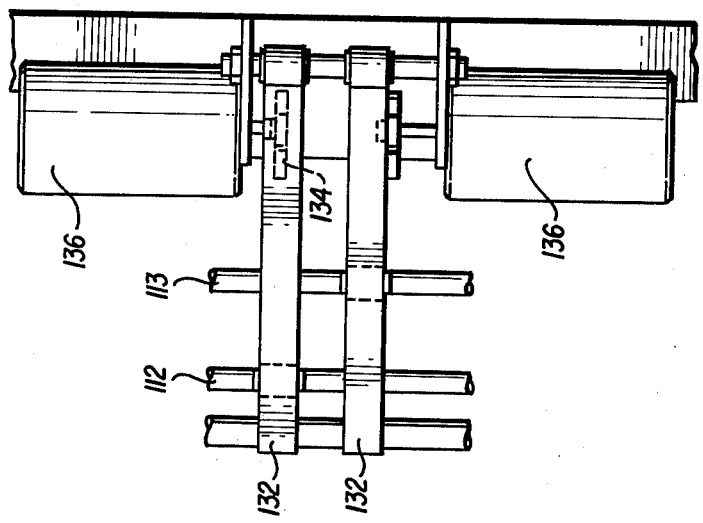
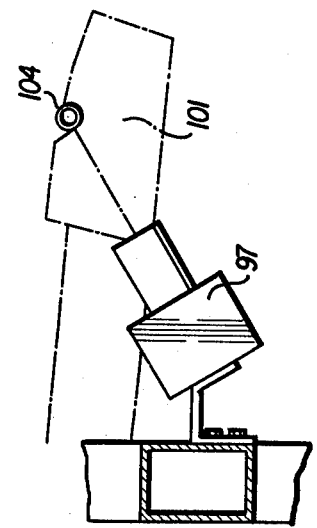
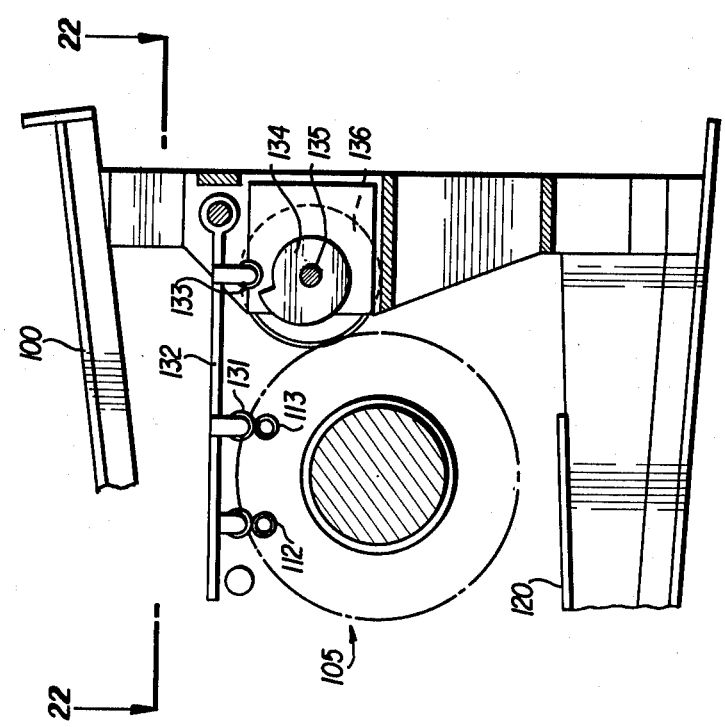
FIG. 22
FIG. 20
FIG. 21

NUCLEAR FUEL ROD LOADING APPARATUS

BACKGROUND OF THE INVENTION

1. Field of the Invention

This invention relates to nuclear fuel rod loaders which automatically load nuclear fuel pellets into fuel rods used in nuclear reactor cores.

2. Description of the Prior Art

The core of a nuclear reactor contains an assembly of fuel rods, arranged so as to generate controlled amounts of heat in specific regions of the reactor core. The fuel rods, approximately thirteen feet in length, each contain a column of nuclear fuel pellets extending substantially the full length thereof. Some of the columns of pellets are organized and arranged in segments, each segment containing different types of fuel pellets varying in quantity of uranium enrichment.

It is critical to the operation of the reactor that these segments of fuel pellets contain the correct type of uranium fuel, that the segments be of the correct longitudinal regions of the fuel rods. These factors are critical in view of the fact that the amount of heat generated in specific regions of the reactor core must be controlled to prevent any possibility of overheating. Additionally, location of certain types of fuel in certain longitudinal regions of the fuel rods is required in order to control the reaction and assist reactor shut-down. Thus, it is important that errors in loading or mixing of the different types of fuel pellets do not occur when the fuel pellets are loaded into the fuel rods.

Experience has shown that previous control methods do not provide the optimum of accuracy desirable in the nuclear industry for assemblage of nuclear fuel rods. Assembly processes and assembly equipment are desirable which fully insure the degree of quality control required for a reliable system of fuel rod assembly.

In many currently used loading systems, fuel pellets and fuel rods are assembled and organized on tables, stands and holders and the assembled rows of fuel pellets are manually propelled into the fuel rods. These systems have been modified with the use of various types of guide bushings developed to assist the operator in aligning assembled rows of fuel pellets with the center lines of the fuel rods so as to facilitate a smooth and damage-free transfer of the pellets into the fuel rods. However, these systems still involve the risk of human failure on the part of the operator and therefore may require multiple checks by other individuals to insure accurate assembly.

U.S. Pat. Nos. 3,940,908 and 3,965,648 disclose improvements over the above-discussed types of prior art systems and wherein preassembled rows of fuel pellets are transferred by mechanical fingers or vibrators into multiple fuel rods. With the apparatus disclosed in these patents, however, the rods themselves must still be placed by hand in the loading position. No provision has been made for automatically weighing the fuel pellets or measuring the lengths of the fuel pellets as they are loaded into the fuel rods. Additionally, no automatic safety controls are included in the loading sequence.

An improvement in systems for assembling nuclear fuel rods according to acceptable standards within the nuclear industry is realized with the improved automated nuclear fuel rod loading apparatus disclosed in U.S. Application Ser. No. 910,999—King et al., filed May 30, 1978, now U.S. Pat. No. 4,235,066, and assigned to the same assignee as the present invention. This apparatus incorporates a microprocessor control for automatically loading nuclear fuel pellets into fuel rods. Additionally, it automatically measures and records the weight and length of the row of pellets currently being loaded, indexes the fuel rods, transfers the proper rod into communicating relationship with the row of fuel pellets at the proper stage in the loading sequence, and moves to index another rod into position after loading of the previous rod has been completed. However, the fuel rod loading apparatus disclosed in the King et al. application provides for the assembly, weighing and transfer of only a single row of fuel pellets into one fuel rod at a time.

It is therefore an object of the present invention to provide new and improved apparatus effective for assembling a plurality of nuclear fuel pellets in columns, with each column containing specific types of nuclear fuel, and for sequentially loading the column into a plurality of fuel rods, and each column contains the correct types and amount of fuel.

Another object of the present invention is to provide new and improved apparatus effective for facilitating assembly of a plurality of nuclear fuel pellets including first and second elongated members, positioning the rows of fuel pellets in a communicating relationship with first and second fuel rods, transferring the pellets from the first elongated member into the first fuel rod through a guide bushing assembly and disengaging the guide bushing assembly from the loaded fuel rod and secondly transferring the pellets from the second elongated member into the second fuel rod through a guide bushing assembly and disengaging the guide bushing assembly from the second loaded fuel rod.

Another object of the present invention is to provide new and improved apparatus effective for automatically indexing a first plurality of fuel rods relative to a plurality of loading stations for receiving pellets, for transferring each rod into communicating relationship with associated means holding a row of fuel pellets at a predetermined stage in the loading sequence, and for indexing a second plurality of rods into loading positions after loading of the previous plurality of rods has been completed.

Another object of the present invention is to provide in the fuel rod loading apparatus, new and improved means for facilitating movement of pellets into fuel rods during assembly and avoiding damage or plugging of the pellets in the fuel rod during the loading sequence.

Another object of the present invention is to provide new and improved fuel rod loading apparatus effective for automatically imposing controls on the loading operation and interrupting the loading sequence in the event the assembled lengths of the rows of fuel pellets within the loaded fuel rods, or the cumulative weights of the pellets in each fuel rod do not fall within certain prescribed limits.

SUMMARY OF THE INVENTION

A nuclear fuel rod loading apparatus is provided which automatically loads nuclear fuel pellets into dual fuel rods with a minimum of manual involvement and in a manner and sequence to assure quality control and accuracy. The apparatus comprises first and second elongated members including "V" troughs for alternately or simultaneously receiving a plurality of pellets of a predetermined type of nuclear fuel and of a predetermined total length when assembled in a row. A set of lights on a length control board mounted between each of the elongated members and segment length marks located on the side of the elongated member "V" trough adjacent to the indicator lights indicates to the operator the length of the row of pellets called for. The segment length marks physically designate where the end point of each row of pellets assembled in each elongated member should be. After the correct length has been assembled, the first elongated member having pellets loaded thereon is moved into a position in which the pellets are to be weighed; the weight is checked and recorded by a microprocessor and the first elongated member is returned to a pellet transfer position in alignment with a guide bushing and push rod. The same procedure is followed for the second elongated member. The second elongated member is in position to receive the assembly of fuel pellets while the first elongated member is being weighed and pushed. The pellets are placed on the second elongated member to the indicated total lengths. The machine then weighs and pushes the fuel into the second waiting fuel rod. Meanwhile, the operator has proceeded to again assemble fuel pellets onto the first elongated member. In a preferred embodiment, the linear travel of the push rod is powered by a motor-operated rotating screw, controlled to apply the proper force and speed from a position behind the row of pellets such as to advance the pellets along the length of the elongated member and into the guide bushing. Each elongated member is provided with an independent push rod and guide bushing for advancing the pellets along the length of the elongated member through the guide bushing assembly and into the awaiting fuel rod.

On the opposite side of each guide bushing, fuel rods are sequentially positioned by a rod indexer controlling a carousel which automatically positions each appropriate rod into an aligned relationship with a respective guide bushing. Prior to loading the fuel pellets, the guide bushing is moved to engage the fuel rod, and the elongated member is positioned in alignment with the guide bushing.

As the pellets from each elongated member are advanced by a push rod through a guide bushing, a light source and photocell cooperate to detect the beginning and the end of the row of fuel pellets. An encoder connected to the rotating screw emits a fixed number of electrical pulses for each revolution of the rotating screw, which directly corresponds to the length traversed by each push rod. The microprocessor is in communication with the photocell and the encoder counts a number of pulses occurring between the beginning and the end of the passage of fuel pellets, and the microprocessor calculates the length of the row of pellets.

Further, the encoder and photocell incorporated in each independent guide bushing are used in conjunction with the push rod to measure the length of the unfilled space remaining in the fuel rod.

As the fuel pellets are being pushed by the push rod along the "V" trough of the elongated member through the guide bushing assembly and into the empty fuel rod, a thumper assembly housed in the rod handling unit facilitates loading of the fuel pellets into the fuel rod.

After the pellets are loaded, the guide bushing is disengaged from the fuel rod, and the rod indexer transfers the next two rods into alignment with the guide bushing for loading. The entire loading sequence is repeated until all the rods held by the rod indexer have been loaded.

BRIEF DESCRIPTION OF THE DRAWING

While the specification concludes with the claims particularly pointing out and distinctly claiming the subject matter of the invention, it is believed that the invention will be better understood from the following description taken in conjunction with the accompanying drawing, wherein:

FIG. 1 is a perspective view showing the pellet assembly and fuel rod loading apparatus of this invention;

FIG. 2 is a block diagram showing the microprocessor 14, digital readout screen 16, computer 15, carousel drive control 111, push rod drive motor control 47, push rod drive motors 46, encoders 50, push rod screws 42, and push rods 40;

FIG. 6 is a top view of the pellet handling unit mechanism showing the rear elongated member with "V" trough 20, the front elongated member with "V" trough 21, zone marks 23, zone lights 24, and pellet stops 25;

FIG. 8 is a partial side view of the pellet assembly apparatus 9 showing the scales 51 in relation to the weighing mechanism and scale bar 52;

FIG. 9 is a sectional view showing the elevating mechanism in a retracted or down position in relation to the elongated member 21;

FIG. 10 is a sectional view showing the elevating mechanism in an extended or up position and the means for engaging the elongated member 21 in the weighing mode;

FIG. 11 is a partial sectional view of the cover actuator 35 as seen from the top of the cover assembly;

FIG. 12 is an elevational view of the cover actuator 35, cover guide "V" wheels 33 and cover hold-down and retaining wheels 32 as seen from the side of the main cabinet assembly;

FIG. 14 is an elevational view of a guide bushing assembly 65, the end of the rod handling unit and an end of a fuel rod employed in the fuel rod loading apparatus of this invention;

FIG. 15 is a cross-sectional view of the guide bushing 73 showing the tapered input passageway 74, funnel-shape rod receiving opening 75 with circular lip 76, fuel rod input passageway 77, and first light sensors 81, first light sources 82, second light sensors 84, and second light sources 85;

FIG. 17 is a partial cross-sectional view generally taken on line 17—17 of FIG. 1 showing the interior of the rod handling unit containing means for transferring fuel rods into a loading position at the carousel and means for transferring loaded fuel rods to a holding means;

FIG. 20 is a partial sectional view showing a portion of the second inclined in-feed ramp rod escapement 101, empty fuel rod 104, and the nuclear fuel rod serial number scanning camera 97, as shown in FIG. 17;

FIG. 21 is a view of the thumper assembly which provides independent articulation of the fuel pellets as they are being loaded into the empty fuel rods, showing the thumper arm extensions 131, thumper arms 132, cam follower 133, cam 134, thumper arm assembly drive motor 136, and the carousel 105;

FIG. 22 is a partial top view of the thumper mechanism showing the cam 134, the thumper arm extensions 131, thumper arm assembly drive motors 136, and nuclear fuel rods 104;

DETAILED DESCRIPTION

Figure 3:
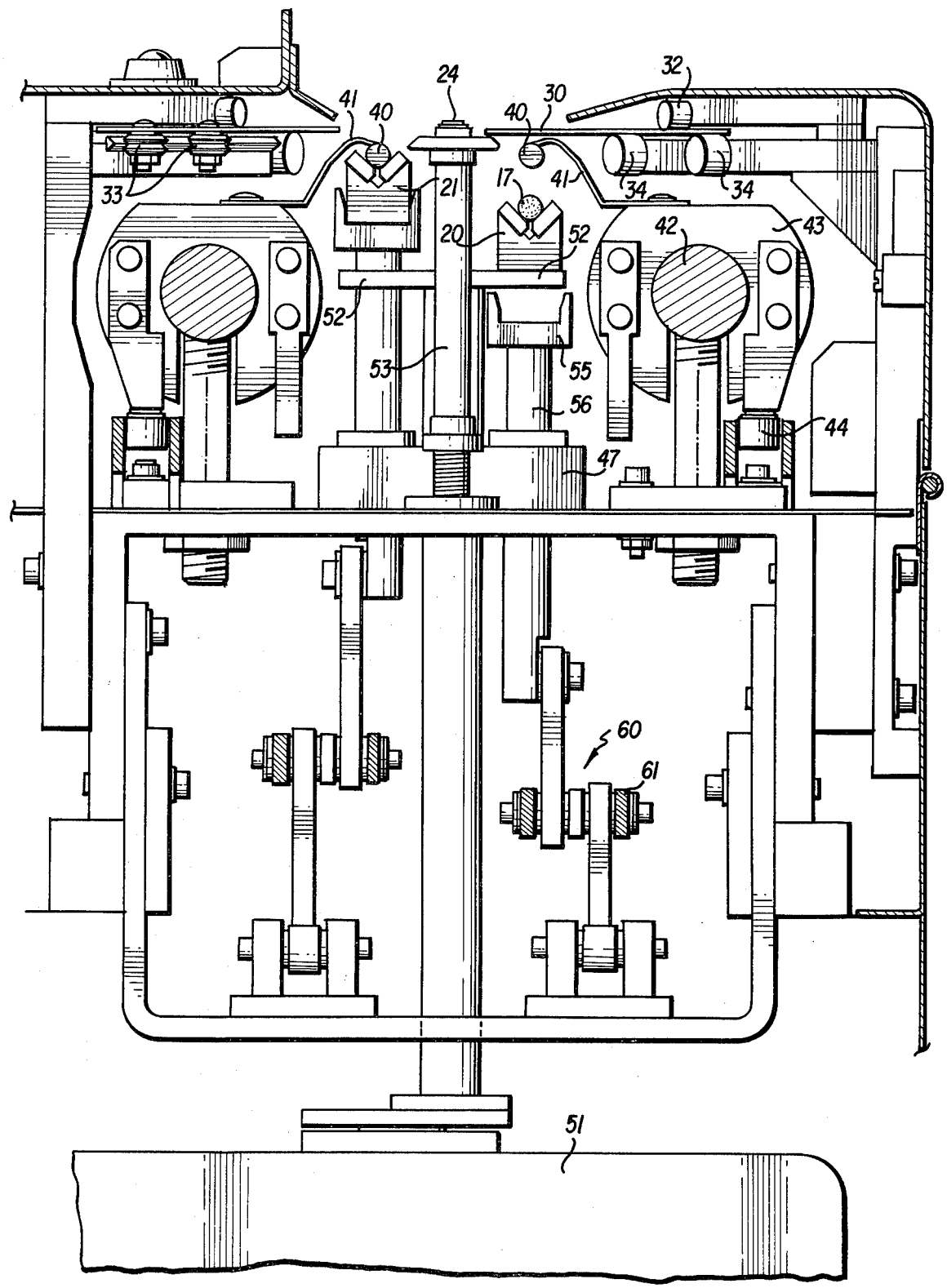
FIG. 3 is an enlarged sectional view generally taken on line 3—3 of FIG. 1 showing the interior of a cabinet containing means for assembling, weighing and transferring fuel pellets into loading positions in alignment with fuel rods.

Referring now to the drawing, wherein like reference characters designate like or corresponding parts throughout the several views, there is shown in FIG. 1, a nuclear fuel rod loading apparatus for automatically loading fuel pellets into fuel rods of the type used in nuclear reactor cores. The apparatus basically comprises three major sections: a pellet assembly apparatus 9, a guide bushing assembly 65, and a rod handling unit 90.

Figure 5:
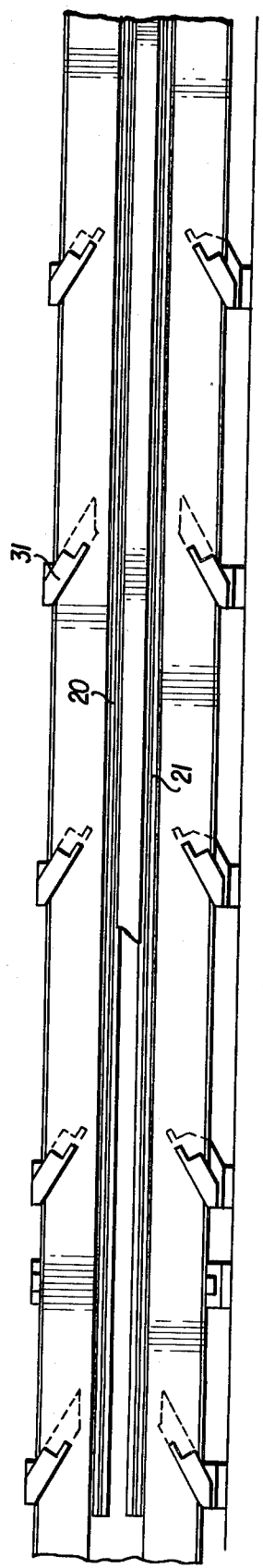
FIG. 5 is a top view of the elongated members and the covers for the elongated members.

The area in which the operator monitors and controls the fuel pellet loading operation of the present apparatus, and as shown in FIG. 1, generally includes a control panel 11 and a worktable 12 mounted over a main cabinet 10. A conveyor system extends the full length of the worktable and is provided for the purpose of depositing one or more trays 13 onto the worktable in a position in which they are accessible to the operator. The operator manually removes the fuel pellets from the fuel trays and deposits the pellets in a split "V" trough of a first elongated member 20 shown in FIGS. 5 and 6 and located nearest the operator, and subsequently loads in the same manner a split "V" trough of a second elongated member 21 positioned further from the operator. A plurality of lights 24 shown in FIG. 6 are provided for indicating to the operator the approximate length of the segment of fuel pellets to be assembled in the individual elongated members according to a rod design plan. A microprocessor 14 shown in FIG. 2 and contained in the cabinet 10 is provided to control the loading operations, and this microprocessor accomplishes several functions including actuation of the correct set of lights 24. The operator assembles the pellets in a row, starting from the extreme right-hand end of the elongated member 20 as seen in FIG. 6, placing the first pellet against a first retractable stop 25 shown in FIGS. 6 and 7 and set by the microprocessor, and continuing to a left-hand end point generally indicated by the particular illuminated light. Exact length indications are provided by a link scale or double zone marks 23 shown in FIG. 6 and indicating plus or minus column length tolerances. The control panel 11 contains the controls from which the operator can monitor the operations of the fuel pellet loading apparatus.

The details of the microprocessor referred to above do not form any part of this invention and the microprocessor may be of any suitable type for directing the proper sequence of operations. In a specific embodiment of this invention an EPTAK microprocessor sold by the Eagle Signal Industrial Controls Division of the Gulf and Western Manufacturing Company, is employed.

Referring again to FIG. 1, in order to effect transfer of fuel pellets from the split "V" trough of each of the first and second elongated members, provision is made for sequentially positioning the first and second elongated members to positions wherein each "V" trough is exposed to the operator when a corresponding cover, which is to be described in detail hereinafter, is in a retracted position to allow the operator to load the fuel pellets into the "V" trough of the elongated member. Specifically, when "start load" is initiated for the first elongated member 20, the correct pellet stops 25 and the length indicator or zone lights 24 are set based on a predetermined rod design load set-up number that has been entered in the microprocessor 14. This indicates the total length of the column to be assembled. At this point, the operator manually places the correct number and length of fuel pellets onto the "V" portion of the elongated member being loaded and then pushes an appropriate weigh button. This causes the elongated member to be lowered to a scale by an elevator mechanism associated with the loaded elongated member. The apparatus includes duel elevator mechanisms, one for each of the elongated members. More specifically, the elevator mechanisms, shown partially in FIGS. 3, 4, 9 and 10, are made up of five evenly spaced vertical supports, each consisting of an elevator platform 55, in cooperation with a vertical slide bar 56; a scale bar 52, scale bar support 53, a toggle mechanism 60, toggle pivot pin 61, all connected together with horizontal connecting rods 62. When the rods 62 are actuated longitudinally to permit the toggle mechanisms to bend to the position of FIG. 9, the elongated member 20 is caused to come to rest on the scale bar 52. The downward force resulting from the weight of the elongated member and pellets thereon is transmitted by the scale bar support 53 to the scale 51. Thusly, the scale 51 is caused to measure the weight of the pellets within the elongated member and this measurement is transmitted to the microprocessor where it is checked for tolerance. If the weight is out of tolerance the elongated member is represented to the operator for corrective action. If the weight is in tolerance, the elongated member is returned to its up position.

Figure 13:
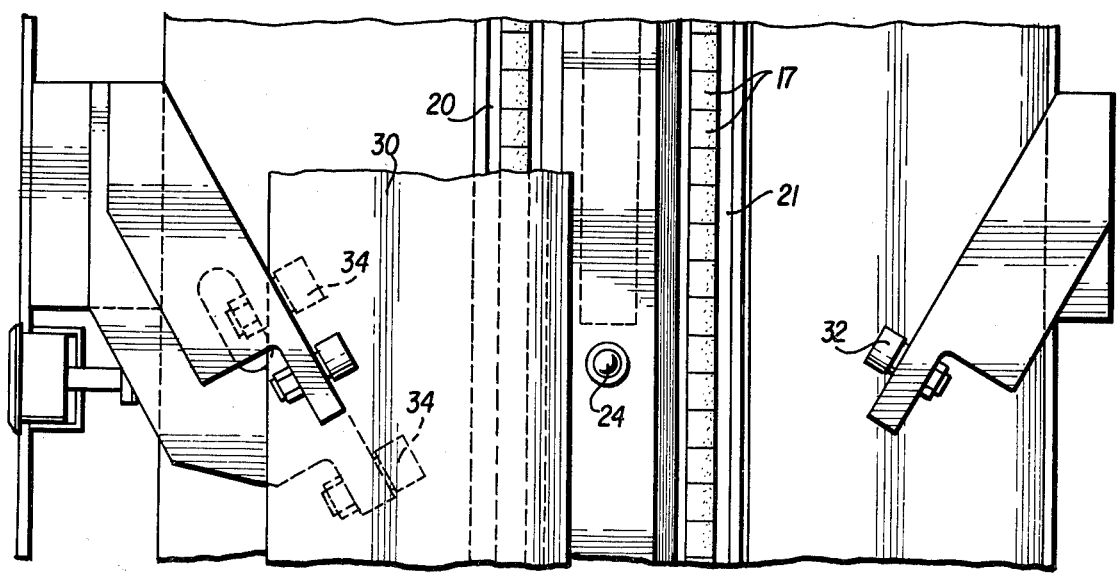
FIG. 13 is a partial top view of the cover assembly showing a cover 30 in position over an elongated member 21 containing pellets 17, a cover in a retracted position, the cover angle support 31, cover hold-down wheels 32, cover support wheels 34, and an indicator light 24.

During the above-discussed pellet assembly and weighing procedures, the elongated member cover, designated 30 and shown in FIGS. 3, 11 and 13, is in a retracted or open position and a corresponding push rod 40 is in an inactive mode to the rearmost position of the elongated member most remote from the guide bushing assembly 65 which is located intermediate the pellet assembly apparatus 9 and the rod handling unit 90. During a subsequent transfer of fuel pellets from the elongated member into the fuel rods by means of actuation of the push rod 40, the corresponding cover 30 is in a closed position. The covers 30 for the elongated members are each approximately 0.120 inches thick, four inches wide and fourteen feet long. In operation, the covers simultaneously move linearly and laterally, or forward and sideways at an oblique angle, when the corresponding cover actuator 35 is actuated. The cover actuators 35, shown in FIG. 11, are each actuated pneumatically in accordance with a programmed command of the microprocessor 14 and effect the opening and closing of the elongated member cover 30. To assist in the operation of each cover 30, there is provided, as shown in FIGS. 5, 11, 12 and 13, a series of horizontal and oblique supports 31, mounted at an angle, and cooperating "V" wheels 33, support wheels 34 and cover hold-down wheels 32. The action of each cover actuator 35 causes the associated "V" wheels 33 carrying the cover to ride the angled supports in the manner illustrated in FIGS. 11 and 12, effecting forward and sideways motion at an oblique angle when the cover is closing over the elongated member. A set of cooperating wheels, one upper wheel 32 and two lower wheels 34, located adjacent to the angle support members 31 provide additional support and the single upper wheel additionally functions to hold down the cover as it is moved by the cover actuator 35. In opening the cover, the cover actuator 35 effects a reverse action on the cover and associated supporting mechanisms. As the first elongated member 20 is lowered onto the scale bar 52, the scale 51, as indicated above, weighs the row of fuel pellets assembled on the first elongated member and then the elongated member is moved to an uppermost position wherein the fuel pellets are positioned for being pushed by the push rod 40 into a waiting fuel rod which has been appropriately positioned by the rod-handling unit 90. Once the first elongated member 20 has returned to its uppermost position, the push rod 40 is activated and pushes the pellets thus assembled in the "V" groove of the first elongated member 20 into the waiting fuel rod. This sequence of operation is then repeated for the second elongated member and continues alternately until all of the fuel rods contained in the fuel rod handling unit have been loaded.

As will be clear from the foregoing, operation generally begins in the area of the pellet assembly apparatus 9 shown in FIG. 1. The fuel pellets are delivered from behind the apparatus control on a tray 13 which is movable by an appropriate conveyor system along the worktable 12. From the worktable 12, the pellets are manually loaded onto the elongated members and then automatically weighed, and subsequently pushed through the guide bushing assembly 65 into fuel rods 104 shown in FIG. 2 supported in a plurality of coaxially spaced carousel holders 106 seen in FIGS. 17 and 18. The operator monitors the operations of the apparatus from a control panel 11. The microprocessor 14 contained inside the apparatus directs the sequence of operations in the fuel pellet loading apparatus, and further performs calculations to determine correct fuel pellet weight as programmed, stores information such as weights and serial numbers of fuel rods, and transfers this information to a central computer to control the several operations of the apparatus.

Referring again to FIG. 1 and as described above, the machine includes dual elongated members 20 and 21, which in the embodiment shown, have split "V" troughs for receiving fuel pellets, the desired number of pellets being taken from the tray 13 and assembled manually by the operator sequentially in each of the elongated members. Additionally, means including the push rods 40 are provided for physically transferring the fuel pellets from the assembly position to fuel rods 104 sequentially and automatically indexed into loading positions.

As also described above, a cover actuator 35 is further provided for activating each of the covers 30 for the elongated members, which covers are each in an open position during loading and weighing and are closed during the transfer sequence whereby the pellets in each of the elongated members are introduced into the fuel rods which is accomplished with the use of the guide bushing assembly 65 to be described in detail hereinafter.

Figure 4:
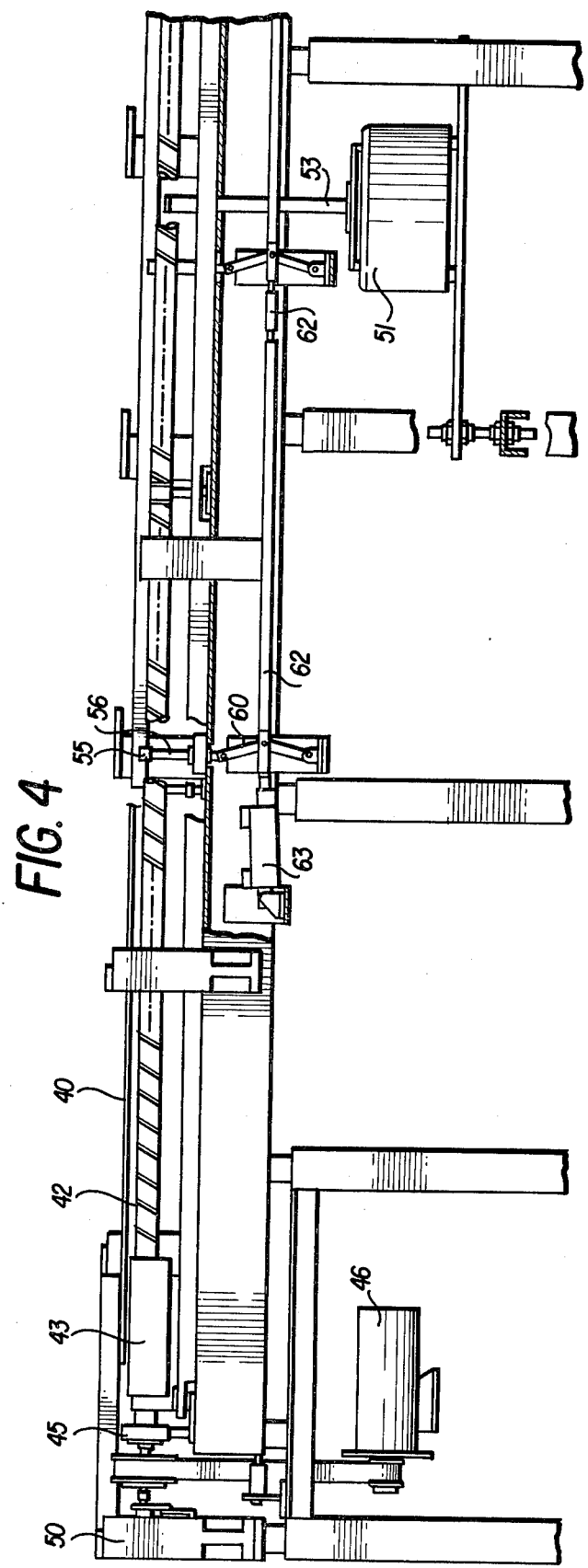
FIG. 4 is an enlarged view showing the interior of the main cabinet of FIG. 1 with means for assembling, weighing and transferring the assembled pellets into the fuel rods.

Referring now to FIGS. 3 and 4, and as mentioned above, scale bar 52 and scale bar support 53 are provided for the purpose of supporting the elongated members during weighing. At this time in the operating cycle, the elongated member is supported entirely by the scale bar 52 and is therefore free of any forces which could be exerted by various other mechanisms associated with the pellet loading assembly. The elongated member and fuel pellets contained therein are then weighed by the scales 51. After the weighing has been completed, the elongated member with "V" trough is returned to its original loading or uppermost position.

Referring again to FIG. 3, a push rod 40 is provided for the purpose of pushing the fuel pellets along the "V" trough of each elongated member and into coaxially positioned fuel rods. The covers 30 are each provided to occupy a position directly above a corresponding elongated member such as to cooperate therewith in providing an enclosed "V" trough to restrain the pellets from rising up and falling out of the elongated member when they are pushed along the "V" trough and into the fuel rod by an associated push rod 40.

Figure 16:
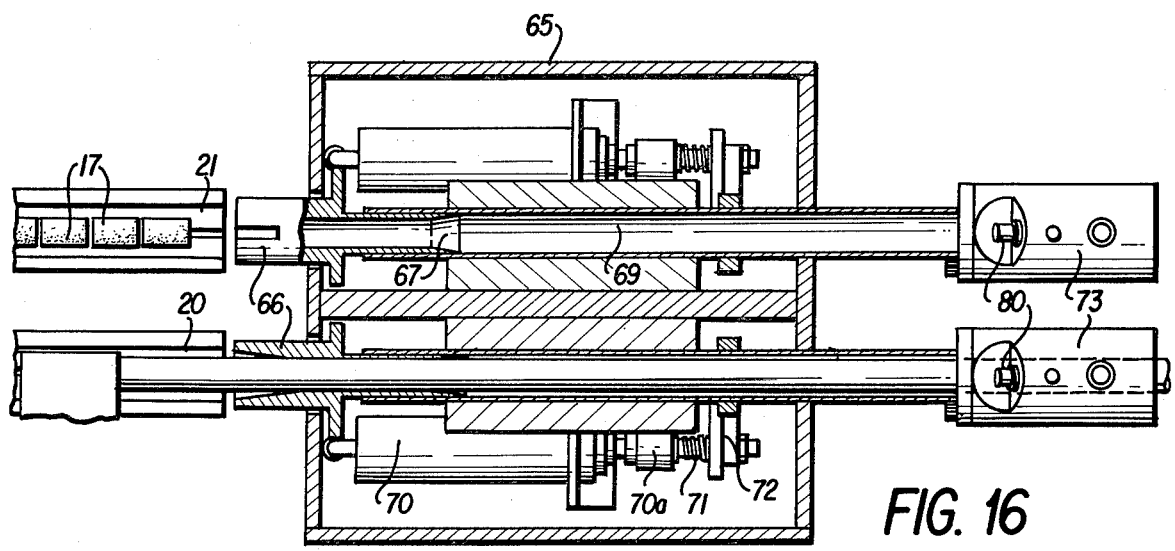
FIG. 16 is a top view of the guide bushing assembly and the rod handling mechanism showing upper elongated member 20, fuel pellets 17, lower elongated member 21, pellet input section 66, input section tapered passageways 67, intermediate section passageways 69, guide bushings 73, and guide bushing assembly actuators 70.

Referring now to FIGS. 2, 14 and 16, the guide bushing assembly 65 includes a support structure for dual guiding mechanisms each provided to have the pellets from an elongated member pushed therethrough by a push rod 40 and to insure proper coaxial alignment for a row of pellets as it is introduced into a fuel rod. More specifically, each of the dual mechanisms includes an input bushing 66 having a passageway 67 including a tapered or funnel-shaped throat to facilitate movement of a row of pellets thereinto. The input bushing 66 is fixedly mounted on the support structure and extends into one end of a passage 68 in a tubular guide member 69. The tubular guide member 69 is supported in the structure in telescoping sliding relation with the inner end of the bushing 66 and is longitudinally actuatable thereon by means including a guide bushing actuator 70, including an actuator rod 70a, a return spring 71 and an arm 72.

Carried on the outer end of each tubular guide member 69 is an output guide bushing generally designated 73, which functions to guide the fuel pellets into the openings in the appropriately coaxially positioned fuel rods 104. As best seen in FIG. 14, each guide bushing 73 includes a guide bushing passageway 74 having a tapered or funnel-shape outlet end 75; the tapered sides of which serve to coaxially align the end of a cooperating fuel rod 104 with respect to the passageway 74, thusly to insure smooth transition of the pellets into the fuel rod. The tapered sides of the passageway 67 serve to align coaxially the pellet column with the input bushing passageway 67 to effect a smooth transfer of fuel pellets from the elongated member into the guide bushing assembly, through the guide bushing assembly and into the associated fuel rod. More specifically, in operation a row of pellets is pushed by an associated push rod 40 into the throat end of the passage 67 in the input guide bushing 67. The actuator 70 is sequentially effective for moving the tubular guide member 69 to the right in FIG. 14. This moves the output guide bushing 73 into cooperating engagement with the adjacent end of a fuel rod for thus coaxially aligning the end of the fuel rod with the bushing members and providing a means for easy transfer of pellets through the input bushing 66, the tubular bushing member 69 and the output bushing 73. Subsequently, and under the influence of the spring 71, the tubular bushing member 69 and the output bushing on the outer end thereof are slid back and out of the way to enable another rod 104 to be indexed into position for loading of pellets thereinto.

In order to check the accuracy of the length of the segment of fuel pellets being loaded into a fuel rod, light sensors 81 and 84 and light sources 82 and 85 are incorporated in the guide bushing assembly on opposite sides of the guide bushings 73. As shown in FIG. 15, the light sensor 81 is positioned on one side of the passageway and the light source 82 is positioned on the opposite side of the passageway 74 in the path of light from the light source 82. When the fuel pellets or the push rod traverse that portion of the passageway directly opposite the light source, the light from the light source is blocked from the photocell resulting in a signal representative of the condition of the photocell being transmitted and affecting operation of the apparatus in a manner to be described more fully hereinafter. While a light source and photocell have been used for this purpose, other devices, such as a pneumatic switch, can also be employed.

To insure removal of dust developed in the output guide bushings 73 from the fuel pellets passing therethrough, provision is made for the introduction of helium or another inert gas under pressure into the passageway 74 for effecting the removal of the gas and dust therefrom. For this purpose tubular members 80 are included which provide inclined openings through the walls of the output guide bushing just preceding the light source and photocell, and tubes are connected to these openings for directing the gas into the output guide bushings 73. Vacuum outlets 83, are provided for withdrawing from the passageway both the helium gas any dust entrained in the gas.

It is important that the fuel pellets not be moved through the passageways in either of the dual guiding mechanisms until the respective output guide bushing 73 has moved into complete engagement with the end of a fuel rod to provide a continuous path for the fuel pellets. To insure that such engagement has occurred before the fuel pellets are moved through the guide bushing, a second light sensor 84 is provided in each output guide bushing 73 and is positioned in one side thereof near the exit end, and a second light source 85 is positioned on the opposite side of the passageway 74. When the output guide bushing 73 moves into engagement with the end of the fuel rod, the fuel rod enters a funnel-like opening 75 and abuts against a circular lip 76 in the guide bushing, interrupting the path to the light sensor 84 from the light source 85. An electric signal indicative of light interruption is transmitted from the photocell to the microprocessor 14 which controls the operation of the push rod and the insertion of the fuel pellets.

Referring now to FIGS. 3 and 4, the arrangement for moving the push rod 40 associated with the first elongated member to advance the pellets is shown. This arrangement includes a screw 42 in threaded relation with a nut 43 suitably supported for longitudinal sliding movement on the apparatus frame. The nut 43 is restrained from rotating with the screw by a stabilizing follower wheel 44. The nut 43 is connected by an arm 41 to the push rod 40. Rotation of the screw 42 effects longitudinal movement of the nut 43 and longitudinal actuation of the push rod. The longitudinal movement of the push rod 40 causes the fuel pellets to be transferred from the first elongated member 20 to the first fuel rod through the guide bushing assembly 65 shown in FIGS. 14 and 16 and in the manner described above.

In like fashion, the fuel pellets contained within the "V" trough of the second elongated member 21, are transferred from the second elongated member by means of operation of an identical push rod assembly associated therewith through cooperation with the guide bushing assembly 65 and into a second fuel rod mounted on the carousel of the rod handling unit mechanism.

Figure 23:
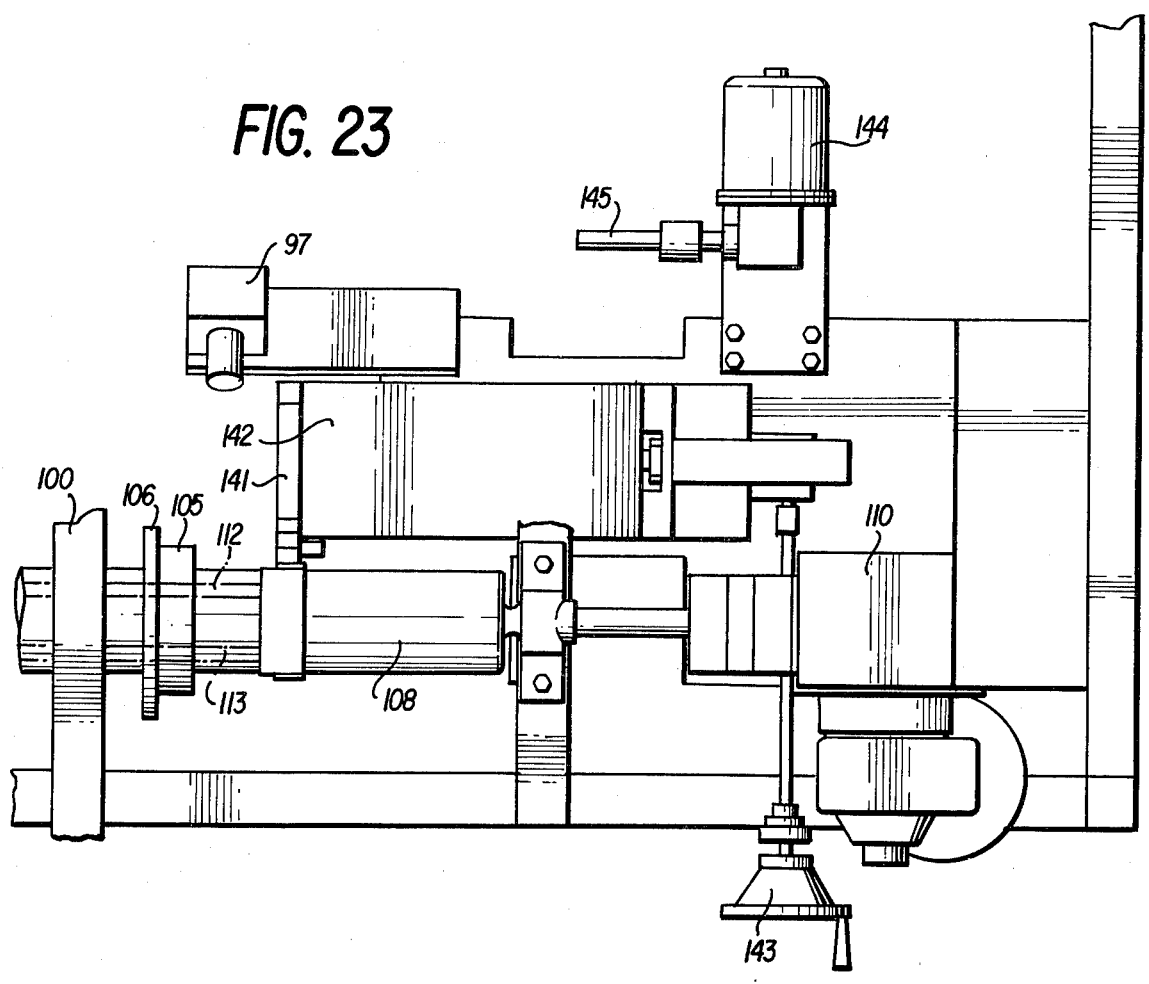
FIG. 23 is a partial top view of the rod handling mechanism showing the backstop 140, backstop slide 141, backstop adjustment handwheel 143, fuel rods 104 mounted within a carousel holder 106 in relation to the backstop, rod rotating wheels drive motor 144 and a flexible drive shaft 145 from the drive motor to the rod rotating wheels as shown in FIG. 18 for activating same.
Figure 18:
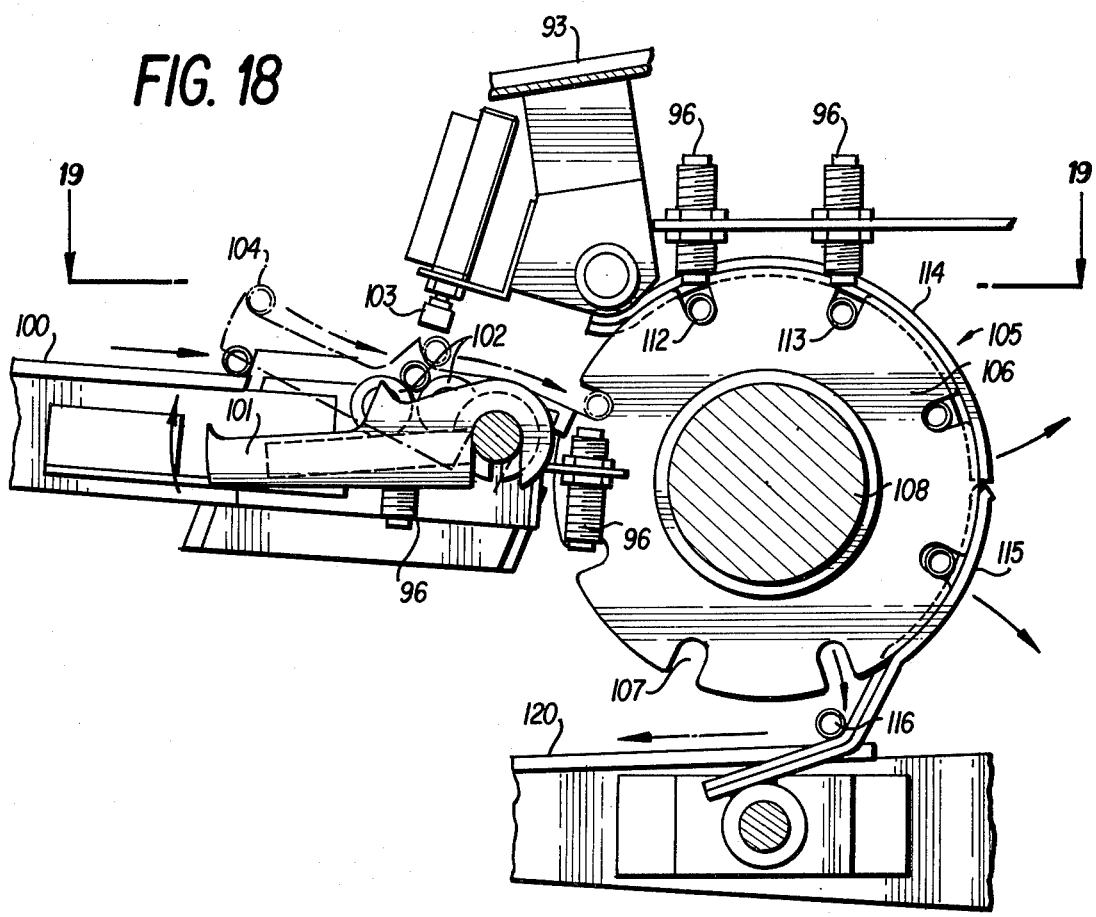
FIG. 18 is an enlarged sectional view showing the second inclined in-feed ramp rod escapement 101 operative to sequentially load empty fuel rods 104 into the rod holding means 106 of the carousel 105, rod holddown means 103, the carousel having sensor means 96 to determine rod location, upper 114 and lower 115 rod retainer means, and first inclined out-feed ramp 120 as shown in FIG. 17.
Figure 19:
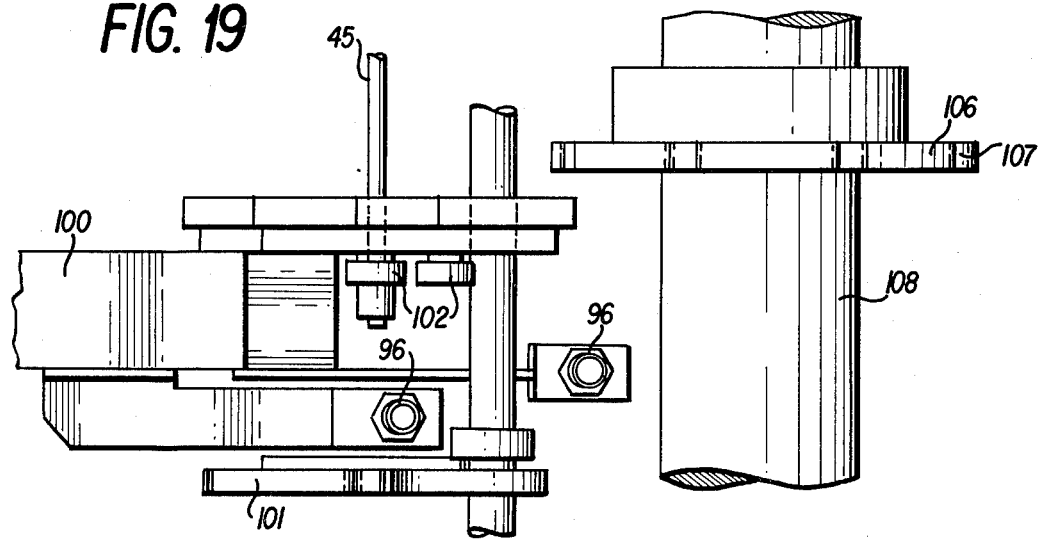
FIG. 19 is a top view of the second inclined in-feed ramp rod escapement 101, sensing means 96 to detect rod location, fuel rod rotating wheels 102, the flexible rod rotating wheel shaft 45, and the carousel shaft 108.

Referring now to FIGS. 17 and 18, the carousel 105, which is located within the rod handling apparatus generally indicated at 90 in FIG. 1, contains a plurality of fuel rods 104 mounted around the circumferences of a plurality of spaced carousel holders 106, and includes means for positioning fuel rods sequentially in line with the output guide bushings 73 in the guide bushing assembly 65. A carousel drive system 110, as shown in FIG. 23, is provided for rotating the carousel 105 to move the rods into loading positions and out of such positions after the fuel pellets from the first elongated and the second elongated members have been loaded into first and second fuel rods on the carousel. The carousel 105 is then rotated a sufficient amount to position the next two fuel rods in alignment with the passageways in the guide bushing. The above-described loading process is then repeated.

As mentioned above, provision is made to weigh the row of fuel pellets after a row has been configured along the length of an elongated member 20 or 21. Referring now to FIGS. 3, 4 and 8, the weighing arrangement for each of the two elongated members, independently includes the previously mentioned two scales 51 mounted in longitudinally spaced relation on a suitable platform. The scales 51 contain load cells but are illustrated only generally because the details thereof form no part of the present invention. The scales can be of any suitable type; and in one embodiment, the scales employed are Model No. 3081 sold by Toledo Scales. A scale bar support 53 extends upwardly from each scale 51 through an opening in the base to a scale bar 52 for engagement with each of the elongated members containing fuel pellets whereby each is independently weighed and before the pellets contained in each of the elongated members are pushed by the push rod 40 into the awaiting fuel rod. More specifically, once the appropriate type and number of fuel pellets are placed in the elongated member, means are provided for lowering each of the elongated members downwardly onto the scale bar and are thereby supported only by the scale bar and are free of any other components of the pellet loading assembly. The results of the electronic weight measurements are displayed on the control panel 11. If the weight is within predesignated parameters as prescribed by the microprocessor, the operation continues. If the weight is not within the predesignated parameters, the operation is halted and a warning light on the control panel illuminates to indicate that the weight of the fuel pellets is not within the predesignated parameters. If the weight of the fuel pellets contained in each of the elongated members is within the defined parameters, the elongated member which has been weighed is returned to its uppermost position. In this mode, the associated push rod 40 is in its push position to the rear of the pellets and the corresponding elongated member cover 30 is in a closed or extended position in order to facilitate pushing of the fuel pellets by the push rod through the guide bushing assembly and into an awaiting fuel rod 104.

Referring now to FIGS. 14, 15 and 16, the elongated member is in its upper position in alignment with the passageway 67 in the input bushing 66, the passageway 68 in the tubular guide member 69, output guide bushing 73, and a fuel rod 104. In order to facilitate movement of the pellets from the "V" trough of the elongated member into the fuel rod, the guide bushing assembly actuator mechanism 70 is operated to move the output guide bushing 73 into engagement with the end of the fuel rod. The actuator 70 which, as noted above, is a pneumatic cylinder provides the force to move the guide bushing assembly 65 and is fixedly mounted below the assembly. The cylinder rod 70a extends from the pneumatic cylinder and is connected to the guide bushing bracket arm 72. The cylinder rod is biased to the left in FIG. 14 by compression spring 71. Actuation of the pneumatic cylinder 70 causes the cylinder rod 70a to move to the right against the bias of the spring 72 and thereby moves the output bushing assembly 73 outward to bring the guide bushing into engagement with the aligned fuel rod 104. An adjustable fuel rod backstop, as more fully described hereinafter, is provided to preclude longitudinal movement of the fuel rod when engaged by the guide bushing. Upon reversal of the pneumatic cylinder 70, the guide bushing is returned to its original position shown in FIG. 14.

referring now to FIGS. 2 and 3, the main cabinet 10 contains a suitable mechanism for advancing the push rod to move the fuel pellets from each elongated member through the guide bushing assembly into the fuel rod, and for retracting the push rod after the pellets have been inserted. Such means include the two screws 42, extending the entire length of the cabinet in a direction parallel to each of the elongated members. A nut 43, which supports the push rod for each of the dual systems, is mounted on the screw for the longitudinal movement along the screw as the screw rotates. Each push rod 40 and push rod arm 41 are fixedly mounted on a pusher nut 43. A motor 46 is provided for rotating each of the screws. The nut 43 is prevented from rotating by push rod stabilizing follower wheel 44. Thus, when the screw rotates, the nut is caused to move longitudinally along the axis of the screw and parallel to each of the elongated members. Each motor 46 serving each of the independent push rod mechanisms is reversible in order that the screw of each may be rotated in either direction selectively to advance or retract each of the push rods.

In order to energize each of the motors 46 which in turn operate the push rod mechanisms, a motor control 47 illustrated schematically in FIG. 2, is provided. Complete control of the motors 46 is provided through both the microprocessor previously referred to and the motor control 47. The motor control 47 receives inputs from the microprocessor and supplies suitably controlled direct current outputs to the motors 46.

In order to properly control the movements of the push rods 40, the motor control 47 and microprocessor 14 receive inputs from the guide bushing mechanism 65 as each row of fuel pellets is being pushed into an awaiting fuel rod 104 in conjunction with the operation of the guide bushing assembly. One of the sources of input is the first position sensor 81 which supplies a signal to the microprocessor 14 when the passage in an output guide bushing 73 is occupied by fuel pellets or the push rod associated with one of the elongated members.

Another source of input is an encoder 50 suitably connected to the end of each of the push rod screws 42 and adapted to rotate in direct response to the rotation of the screws. The encoder 50 is a device well known to those skilled in the art and which emits a predetermined number of electrical pulses per revolution of the encoder and therefore of the screw. The electrical pulses emitted by the encoder 50 during rotation of the screw are transmitted to the microprocessor 14. The microprocessor 14 counts electrical pulses received from the encoder. Inasmuch as each revolution of a screw 42 moves the associated push rod 40 a fixed amount, the number of pulses counted is a direct function of the distance traversed by the push rod. The number of electrical pulses received from the encoder is transformed by the microprocessor into a distance measurement which is displayed on a digital read-out generally indicated by 16 in FIG. 1, and mounted on the control panel 11 such as to be readily viewable by the operator.

Additionally, the microprocessor 14 is programmed to automatically command each pusher motor 46 to reverse direction when the associated push rod 40 has entered a fuel rod and the number of pulses of the encoder 50 totals a predetermined number. Reversing the motor reverses the direction of movement of the push rod such as to retract the push rod from the fuel rod.

In order to calculate the length of the row of fuel pellets being inserted into the fuel rod, the position sensor photocell 81 detects a beginning of the row of fuel pellets and transmits a corresponding electrical signal to the microprocessor 14. The microprocessor upon receiving this signal, begins counting the number of pulses emitted by the encoder 50. In order to sense the end of the column of pellets being loaded into the fuel rod, each of the push rods is constructed with a traverse hole positioned a predetermined distance from the end thereof. The traverse hole allows the re-establishment of the path of light from the light source to the position sensor photocell 81. Re-establishment of the light path causes the photocell to transmit a signal to the microprocessor causing the microprocessor to mark the counting of electrical pulse from the encoder. The microprocessor totals the number of electrical pulses received from the encoder, translates this quantity into distance, subtracts the predetermined distance from the end of the push rod to the traverse hole and thus calculates and checks the length of the row of fuel pellets actually being inserted into the fuel rod. This length is displayed on the digital readout 16 mounted on the control panel to be viewed by the operator.

In the fabrication of fuel rods, it is necessary that the assembled fuel pellets terminate at a specific point within the fuel rod in order to leave a specified unoccupied space therein. In order to verify the unoccupied part or space within the fuel rod to insure that it is within prescribed limits, a measurement is made by the microprocessor 14. This is accomplished by counting electrical pulses from the encoder from the point when the traverse hole re-establishes the light beam until the fuel is moved to the bottom or end of the fuel rod. The pusher is programmed to push the fuel pellets very gently the last few inches. After the processor senses non-movement of the push rod, that is, that the fuel is against the bottom or end of the fuel rod, the microprocessor marks the pulses from the encoder, calculates the distance traveled, and checks the length measurement for correctness. If it is correct, the processor goes to the next sequence. If it is incorrect, an alarm is sounded so the fuel rod can be marked for later disposition.

Referring now to FIGS. 17 and 18, the rod handling mechanism 90 is provided for the purpose of holding and automatically advancing fuel rods, and for positioning each fuel rod, in turn, within the carousel holders 106 which cooperate to form the carousel 105 and further for aligning the fuel rods with the output guide bushings 73 at the appropriate stage in the loading sequence. In relation to the carousel 105, the fuel rod indexer further comprises, as shown in FIG. 17, an empty rod holder 91 and first inclined input ramp 93 having an in-feed stop 94 at the lower end thereof for retaining fuel rods in a static position and a ramp escapement 95, for sequentially feeding fuel rods from the first inclined input ramp to a second inclined in-feed ramp 100 located below the first inclined in-feed ramp. The second in-feed ramp 100 is adapted to sequentially feed the fuel rods into the carousel 105 in cooperation with an infeed ramp rod escapement 101 located at the lower end of the second inclined in-feed ramp for individually feeding the fuel rods into the carousel holders 106. Subsequent to the indexing and loading of the fuel rods contained within the carousel from the in-feed ramps, as more fully described below, there are provided two inclined output ramps which serve to transport the loaded fuel rods away from the carousel and to a retaining station. The first inclined output ramp 120 has its highest end adjacent the bottom of the carousel for receiving fuel rods therefrom and transporting them to a lower level to a second inclined output ramp 122 in cooperation with a lower fuel rod retainer 123 mounted on the lower right-hand side of the carousel as shown in FIG. 17. The fuel rods are gravity fed onto the first inclined output ramp 120 from the holder 91 and are stopped at the lower end of the first inclined output ramp by an output stop 94. Sensors 96, shown in FIG. 17 at the bottom of outer ramp 93, are provided along the entire in-feed and output route at predetermined locations on each ramp and also adjacent the carousel for monitoring the movement of the fuel rods as they are cycled through the fuel rod indexer mechanism. As the fuel rods collect on the first inclined output ramp 120, an escapement 121 located adjacent the output stop 94 sequentially feeds the located fuel rods to the second inclined output ramp 122 located below the first inclined output ramp. The second inclined output ramp 122 has a restricter escapement 123 located approximately midway along the second inclined ramp which operates to deaccelerate the rolling fuel rods, and a fuel rod retaining stop 124 at the lower end thereof serves to hold the loaded fuel rods in a static position for subsequent unloading. As mentioned above, the carousel 105 constitutes a plurality of circular holders 106 for retaining fuel rods. The holders 106 are mounted in longitudinally spaced relation on a central shaft 108 suitably journalled in the apparatus frame structure, and in the present embodiment there are five carousel holders spaced approximately thirty inches apart, with the first carousel holder 106 located approximately twelve inches from the end of the shaft adjacent the guide bushing assembly 65. Each holder 106 includes a plurality of circumferentially spaced recesses 107 for receiving fuel rods. In order to retain the fuel rods in the recesses 107, retainers 114 and 115 are provided that point outwardly and are clamped around the circumference of the circular holders to retain the fuel rods in place during loading operations. In one embodiment, the circular holders 106 each contain eight recesses. For convenience of description, the recesses containing the first and second fuel rods to be loaded are numbered 112 and 113 in FIG. 17 During loading, two empty fuel rods are positioned by the carousel in generally longitudinally aligned relation with respect to the guide bushing mechanism 65, and the first and second elongated members 20 and 21. In conjunction with the carousel holders, there is provided at the end of the carousel shaft remote from the guide bushing assembly and to the rear of the last carousel holder, an adjustable fuel rod backstop 140, as shown in FIG. 23. The adjustable fuel rod backstop 140 is attached to a backstop slide 142 mounted parallel to the carousel shaft 108. Attached to the backstop slide 142 is a backstop plate 141 positioned perpendicular to the carousel shaft. The fuel rod backstop 140 may be manually adjusted by a backstop adjustment handwheel 143, to engage the end of the fuel rods contained within the carousel holders mounted on the carousel shaft. The backstop 140 precludes slippage of the fuel rods when the guide bushing aligns and engages the fuel rod and during insertion of the fuel pellets. Upon completion of the insertion of the fuel pellets into the first two fuel rods, the output guide bushing 73 is retracted and the carousel then advances two empty fuel rods to be loaded.

Referring now to FIGS. 21 and 22, a thumper arm assembly is shown in relation to a holder 106 of the carousel mounted on the shaft 108. As noted above, the shaft 108 carries a plurality of carousel holders 106 evenly spaced therealong, which function to support the fuel rods along the entire length. The present embodiment provides for the incorporation of a thumper arm assembly located centrally between the second and third carousel holder or fuel rod support means. The thumper arm assembly shown in FIGS. 21 and 22, includes a pair of thumper drive motors 136, cam shafts 135, cams 134, cam followers 133 pivotally attached to the thumper arm assembly housing and including duel elongated metal thumper arms 132 having elongated metal thumper arm extensions 131 composed of a resilient circular formed material and which directly contact the fuel rods during operation of the thumper arm assembly. In operation, the assembly drive motors 136 turn the cams 134 to lift and drop the cam followers 133. Thus, in an oscillatory pattern, the assembly arm extensions are caused alternately to engage and disengage the fuel rods as the fuel pellets are being inserted. The oscillatory action coupled with the resilient characteristics of the thumper arm extensions effect a sinusoidal type action along the entire lengths of the fuel rods facilitating the insertion of fuel pellets therein.

A carousel drive mechanism is provided for the purpose of rotating the carousel. This drive is controlled by a signal supplied from the microprocessor 14 which causes the drive motor 110 in FIG. 23 to rotate the carousel through an appropriate mechanical coupling and at the proper time and by the proper amount to present the fuel rods to be loaded in an aligned position with the output guide bushing 73 as shown in FIG. 14. The microprocessor receives an electrical signal from a sensor 96 to determine that the carousel has rotated to the desired circumferential position. Only the number of fuel rods required for the particular loading operation are placed in successive recesses in the carousel holders. The microprocessor automatically commands the carousel control to rotate so as to present at the guide bushing assembly only those recesses which contain empty fuel rods.

In a preferred embodiment of operation, the fuel pellets are assembled in each of the elongated members, and loaded into the fuel rods consecutively until all of the fuel rods have been loaded.

Figure 7:
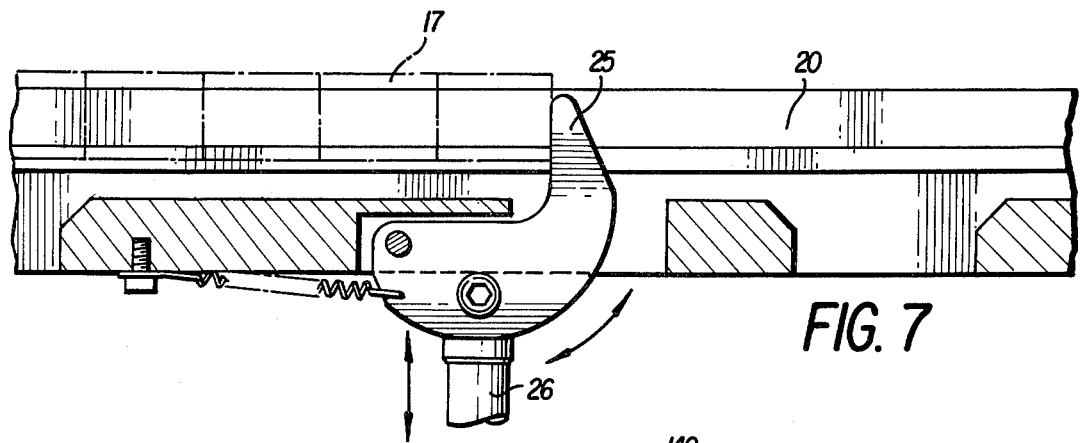
FIG. 7 is a partial cross-sectional side view of the upper elongated member showing fuel pellets 17 disposed within the "V" trough of the elongated member, the retractable pellet stop 25, and the pellet stop actuator 26.
Figure 24:
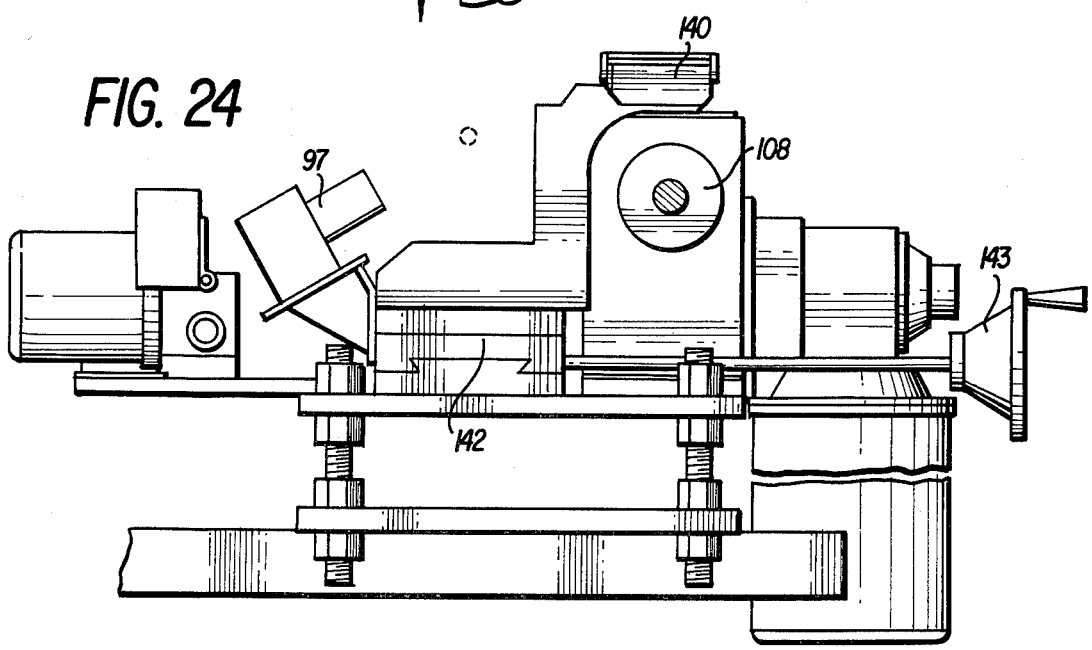
FIG. 24 is a partial cross-sectional view of the rod handling mechanism showing the backstop 140, backstop slide 142, backstop adjustment handwheel 143, carousel shaft 108, and fuel rod serial number scanning camera 97.

When the fuel pellets are presented in a tray 13 on the worktable 12, the microprocessor designates the exact length to be assembled by setting a pellet stop 25 as shown in FIG. 7, on the elongated member which acts as a starting point and by turning on the light indicators 24 adjacent to the linked parameters or zone marks on the elongated member. The first elongated member is presented and the operator places the fuel pellets in a row on each of the elongated members until the segment length extends from the far right-hand side of the first elongated member to the end point corresponding to the segment length designated.

To begin the load procedure, the operator enters the rods to be loaded identification information to a reader, enters a code number corresponding to the rod configuration to be loaded and pushes a "start load" switch on the control panel 11. This causes the microprocessor to set up the machine components for the desired rod configuration, parameters, and sequence necessary to automatically weigh the fuel pellets contained in the elongated members, and if the pellets are within the weight parameters predesignated, the elongated member is placed in a position for transferring the fuel pellets from the elongated member into the awaiting fuel rod. The microprocessor commands the rod handling mechanism to present the rods to a position where the rod serial number can be observed by a camera 97 as shown in FIG. 17 which relays the serial number to a closed circuit television monitor positioned on the control panel in front of the operator. Initiation of the loading procedure by the operator causes the microprocessor to activate a drive motor 44 as shown in FIG. 23 having a flexible drive shaft 45 connecting the motor with rod rotating wheels 102 associated with lower in-feed ramp rod escapements and the carousel holders as shown in FIG. 18. As the lower in-feed ramp escapement indexes the fuel rods, the rod rotating wheels rotate the fuel rod so that the serial number printed around the circumference of the fuel rod end remote from the guide bushing may be read by the aforementioned camera. The camera utilized according to the preferred embodiment of the present invention is a General Electric TN-2200, manufactured by the General Electric Company, Syracuse, New York. The operator reads the monitor and then enters the serial number into the microprocessor by means of a keyboard. The microprocessor checks the number for duplicates, stores the serial number in the memory unit of the microprocessor 14, indexes that rod into the carousel and indexes another fuel rod into the serial number reading position. The microprocessor causes the carousel drive 110 to rotate the carousel as the fuel rod serial numbers are read and the fuel rods indexed into the recesses in the carousel holders until two empty fuel rods are in alignment with the guide bushing assembly 65.

The operator pushes a "weigh" button on the control panel 11. The first elongated member 20 is lowered and the microprocessor automatically determines the weight of the pellets contained within the first elongated member. If the weight is incorrect the elongated member is represented to the operator for corrective action. If the weight of the fuel pellets contained in the first elongated member is within the established parameters, the machine then moves the first elongated member back into the transfer mode and prepares the elongated member for transfer of the fuel pellets from the first elongated member into the first fuel rod positioned to receive the fuel pellets. After the first elongated member with fuel pellets contained therein has been weighed and is in the transfer position, the second elongated member 21 is presented so that the fuel pellets can be loaded to the desired length and is then automatically lowered into the weigh position and the same sequence of operation is repeated. During this process of weighing the pellets contained in the second elongated member 21, the pellets in the first elongated member 20 which have been weighed are then automatically transferred by means of the associated push rod 40 into the awaiting aligned first fuel rod. This is followed by repeating the same steps for the second elongated member 21 and continues repetitively in the sequence of first mocking up for loading an elongated member, weighing the elongated member, and transferring the fuel pellets therefrom into an empty fuel rod. It is to be understood that the mock up, weighing and transfer of pellets into awaiting fuel rods may be accomplished alternatively from first and second elongated members or by simultaneously mocking up, weighing and transferring of the fuel pellets as programmed into the computer.

In sequential relation, the carousel continues to advance empty fuel rods in cooperation with the guide bushing assembly 65 and first and second elongated members thereby positioning two fuel rods for loading.

The guide bushing assembly actuator 70 shown in FIG. 14 now cycles to move the output guide bushing 73 longitudinally into engagement with the aligned fuel rods 112 and 113 as shown in FIG. 17. This is immediately followed by aligning the elongated member such that the pellets are transferred longitudinally by the push rod through the guide bushing assembly. The input guide bushing 66 of the guide bushing assembly 65 serves to align the elongated members with the passages in the guide bushing assembly and the empty fuel rods within the carousel. This alignment insures a smooth transition of fuel pellets from the elongated members through the guide bushing assembly to prevent chipping or other damage to the fuel pellets during the transfer operation. Additionally, during the transfer operation, the covers 30 of each of the elongated members are in a closed or extended position to preclude the pellets from being pushed out of the first and second elongated members as the pellets are being transferred into the fuel rods.

As the pellets are transferred through the input bushing 66 of the guide bushing assembly, the microprocessor 14 automatically determines the length of the row of fuel pellets currently being loaded. The information is stored, enabling the microprocessor to calculate the total length of the fuel pellets inserted in each rod.

As the row of fuel pellets from the first elongated member 20 is inserted into the fuel rod, the associated push rod continues to advance until a predetermined number of pulses have been counted by the microprocessor. The push rod assembly, as previously described, pushes the fuel pellets gently into the fuel rod until resistance is encountered, at which time the processor senses that movement is not present. That is, that the fuel is against the bottom or end of the fuel rod, at which point the processor marks the pulses from the encoder, calculates the distance traveled, and checks the length measurement for correctness. If correct, the process goes to the next sequence, if not, an alarm is sounded so that the fuel rod can be marked for later disposition.

The microprocessor 14 then causes the push rod drive motor to reverse the direction of rotation of the push rod screw 42 and consequently reverses direction of movement of the push rod 40. The push rod 40 is retracted from the fuel rod and the guide bushing assembly to its original position at the opposite end of the first elongated member, and the output guide bushing 73 moves back clear of the fuel rod indexer. The same sequence of operation is then repeated for the pellets contained in the second elongated member.

The carousel drive system 110 automatically rotates the rod carousel 105 to bring the next pair of empty fuel rods into a position in alignment with the output guide bushing 73 and the elongated members while the operator is assembling the fuel pellets in the "V" trough of the first elongated member and the push rod of the second elongated member has been retracted from the fuel rod. The operator, having assembled the appropriate length of fuel pellets within the first elongated member, initiates the loading sequence, and the entire loading process is automatically repeated.

It will be apparent that modifications and variations are possible in light of the above teachings. It therefore is to be understood that the following claims are intended to cover all modifications within the spirit and scope of the invention as disclosed.

What is claimed is:

1. An apparatus for loading fuel rods with fuel pellets repetitively in first and second sequences of operation comprising:

(a) first and second elongated members for receiving fuel pellets to be loaded alternately in first and second fuel rods;

(b) a fuel rod indexer for positioning first and second fuel rods for receiving said fuel pellets, said fuel rod indexer being effective for positioning said first fuel rod to be loaded with pellets from said first elongated member and for positioning said second fuel rod to be loaded with pellets from said second elongated member;

(c) first means for transferring pellets from said first elongated member into said first fuel rod in a first sequence of operation, and second means for transferring pellets from said second elongated member into said second fuel rod in a second sequence of operation subsequent to said first sequence of operation; and (d) means for actuating said fuel rod indexer upon completion of said second sequence to reinitiate said first and second sequences of operation.

2. The apparatus recited in claim 1, wherein said fuel rod indexer comprises:

(a) a carousel comprising a plurality of rotatable fuel rod holders each having a plurality of circumferentially spaced recesses for sequentially receiving a plurality of fuel rods;

(b) means to retain said fuel rods in said recesses;

(c) means to rotate said carousel;

(d) a control for controlling rotation of said carousel to sequentially present two fuel rods in a position with each in alignment with one of said elongated members; and (e) means for effecting controlled release of said fuel rods from said carousel.

3. The apparatus recited in claim 1, wherein said fuel rod indexer comprises:

(a) a first inclined input ramp;

(b) means at the lower end of said ramp for stopping and retaining fuel rods in a static position thereon, said means being operative to sequentially feed fuel rods onto a second inclined ramp;

(c) a second inclined ramp located below said first ramp having;

(d) means at the lower end of said second ramp for sequentially spacing said fuel rods, and means for rotating said fuel rods, means for transmitting a serial number on each said rods to a remote monitor, and means for individually feeding said rods to a carousel;

(e) a carousel comprising a plurality of fuel rod holders each having a plurality of circumferentially spaced recesses for sequentially receiving a plurality of fuel rods;

(f) means to retain said fuel rods in said recesses;

(g) means to rotate said carousel;

(h) a control for controlling rotation of said carousel to sequentially present two fuel rods in a position with each in alignment with one of said elongated members;

(i) means for effecting controlled release of said fuel rods from said carousel onto a third inclined ramp;

(j) a third inclined ramp having means at one end thereof for stopping and retaining fuel rods in a static position, said means being further effective to sequentially feed fuel rods onto a fourth inclined ramp; and (k) a fourth inclined ramp including means for decelerating said fuel rods on said ramp, for retaining said fuel rods, and for stopping said fuel rods at the end of said fourth inclined ramp.

4. The apparatus recited in claim 1, wherein said fuel rod indexer includes a thumper arm assembly comprising:
   (a) dual elongated thumper arm extensions;
   (b) dual elongated thumper arms;
   (c) means pivotally attaching said arms to said thumper arm assembly; and
   (d) means effective for actuating said thumper arms and effecting periodic engagement of said thumper arms with said rods.

5. The apparatus recited in claim 4, wherein said means for actuating said thumper arms comprises cams, motors for driving said cams, and cam followers carried by said arms.

6. The apparatus recited in claim 1, wherein:
   (a) each of said elongated members comprises a "V" trough mounted for movement between a first position for receiving a plurality of pellets and a weighing position; and
   (b) said apparatus further comprises a pair of weighing stations and means to lower each said elongated member to a weighing position for weighing each said elongated members and any pellets in said trough thereof, and means for returning each said elongated members to the first position thereof for cooperating with said means for transferring said pellets therefrom into a fuel rod.

7. The apparatus recited in claim 1, wherein said means for transferring said fuel pellets comprises:
   (a) a first slidable cover for said first elongated member and a second slidable cover for said second elongated member;
   (b) means for actuating said first and second covers into open positions to uncover said first and second elongated members prior to the sequential loading of pellets into said first and second elongated members;
   (c) means for alternately positioning said first slidable cover in open and closed positions above said first elongated member and for alternately positioning said second slidable cover in open and closed positions above said second elongated members; and
   (d) means for activating said first and second covers into closed positions above said first and second elongated members after said first and second elongated members have been sequentially loaded with pellets.

8. The apparatus recited in claim 1, wherein said means for transferring said fuel pellets comprises:
   (a) a first push rod positioned in alignment with said first row of pellets in said first elongated member in a first sequence of operation, and a second push rod position in alignment with said second row of pellets in said second elongated member in a second sequence of operation;
   (b) a first lead screw for effecting linear movement of said first push rod in a first sequence of operation;
   (c) a second lead screw for effecting linear movement of said second push rod in a second sequence of operation;
   (d) a first reversible motor to rotate said first lead screw in a first sequence of operation and a second reversible motor to rotate said second lead screw in a second sequence of operation;
   (e) motor control means operable to energize said first reversible motor for advancing said first push rod to insert said pellets in said first elongated member into said first fuel rod and to reverse said motor after insertion of said pellets for retracting said first push rod from said first fuel rod;
   (f) said motor control means being further operable to energize said second reversible motor for advancing said second push rod to insert pellets in said second elongated member into said second fuel rod and to reverse said motor after insertion of said pellets for retracting said second push rod from said second fuel rod; and
   (g) means for selectively operating said motor control means to energize said reversible motors for advancing and retracting said first and second push rods either in unison or alternately.

9. The apparatus recited in claim 1, wherein said first and second elongated members are each associated with weighing means comprising:
   (a) a scale;
   (b) support means for holding said elongated member and for transmitting the weight thereof and any pellets thereon to said scale; and
   (c) an elevating mechanism for sequentially raising said elongated member to a pellet loading position wherein the elongated member is raised off of said support means, and lowering said elongated member onto said support means.

10. The apparatus recited in claim 9, wherein said support means further comprises an elongated scale bar for supporting the elongated member, and a vertically slidable member supporting said scale bar and transmitting the weight of said elongated member and any pellets contained thereon to said scale.

11. The apparatus recited in claim 9, wherein said elevating mechanism further comprises:
   (a) toggle means effective for raising and lowering the elongated member onto and off of the scale bar of said weighing mechanism; and
   (b) a vertically slidable bar having the elongated member support means mounted on the top thereof adjacent each elongated member for supporting said support means during the raising and lowering operations.

12. The apparatus recited in claim 9, wherein said scale further comprises electronic weighing devices cooperating with said elevating mechanism and comprising:
   (a) bases;
   (b) electronic weighing devices mounted on said bases;
   (c) means for supporting said elongated members and said fuel pellets therein on said weighing devices whereby said weighing devices sense the weight of said elongated members on said pellets;
   (d) said electronic weighing devices being effective for developing signals representative of the weight of said fuel pellets and said elongated members; and
   (e) means for receiving signals from said weighing devices and calculating the weight of said fuel pellets.

13. The apparatus recited in claim 1, further comprising a guide bushing assembly interposed between said fuel rod indexer and said elongated members to assist in the transfer of said pellets into fuel rods positioned in axial alignment with said elongated member by said indexer; said guide bushing assembly having dual longitudinal passageways coaxially aligned between said elongated members and fuel rods for facilitating transfer of said fuel pellets therethrough and into said rods.

14. The apparatus recited in claim 13, wherein said guide bushing assembly comprises:
 (a) dual input bushings containing longitudinal passages having tapered throats for receiving said fuel pellets;
 (b) dual output guide bushings containing longitudinal passages having tapered output ends for engaging the ends of said fuel rods and centering said fuel rods relative to said passageways; and
 (c) means for effecting relative longitudinal movement of said output guide bushings relative to said input guide bushings to effect engagement of said tapered output ends of said output guide bushings with said fuel rods.

15. The apparatus recited in claim 13, further comprising a guide bushing actuator to move said output guide bushing longitudinally to engage the ends of fuel rods presented by said fuel rod indexer.

16. The apparatus recited in claim 1, further comprising a guide bushing assembly interposed between said fuel rod indexer and said row of fuel pellets to assist in the transfer of said fuel pellets into the fuel rods presented by said fuel rod indexer; said guide bushing assembly having longitudinal passageways for passage of said fuel pellets therethrough.

17. The apparatus recited in claim 13, further comprising an adjustable fuel rod backtstop comprising:
 (a) a backstop plate;
 (b) a backstop slide with said backstop plate affixed thereto, said backstop plate mounted perpendicular to the longitudinal axis of said fuel rod indexer;
 (c) means for effecting horizontal movement of said backstop plate in a plane along the axis of said indexer; and
 (d) means for adjusting the position of said fuel rod backstop plate relative to the ends of fuel rods presented for loading by said fuel rod indexer.

18. The apparatus recited in claim 13, further comprising means for determining the length of the row of fuel pellets inserted comprising:
 (a) an encoder responsive to rotation of said screw for generating a predetermined number of pulses per revolution of said screw.
 (b) a light source positioned to emit light along a light path across a passageway in said guide bushing assembly;
 (c) a photocell positioned to receive light from said light source;
 (d) means responsive to interruption of said light path by the pellets being pushed through said passageway to initiate counting said pulses from said encoder;
 (e) a push rod having an aperture extending traversely therethrough at a predetermined distance from the end of said push rod for re-establishing said light path to terminate counting of said pulses; and
 (f) means for determining from the number of pulses the amount moved by said push rod between interruption and reestablishment of said light path and for subtracting said predetermined distance to determine the length of said rod of fuel pellets being inserted.

19. The apparatus recited in claim 8, and further including:
 (a) an encoder responsive to rotation of each screw for generating a predetermined number of pulses per revolution of said screw;
 (b) means to count said pulses; and
 (c) said last-named means being operative dependent upon receipt of a predetermined total number of pulses from said encoder for effecting reversal of said motor after said fuel pellets have been inserted into said fuel rod.

20. The apparatus recited in claim 8, wherein said means for transferring said fuel pellets comprises:
 (a) a push rod positioned in axial alignment with said row of fuel pellets;
 (b) a reversible motor to rotate said screw; and
 (c) a motor control to energize said motor for advancing said push rod to insert said fuel pellets into said fuel rod and to reverse said motor after insertion of said fuel pellets for retracting said push rod from said fuel rod.

21. The apparatus recited in claim 7, wherein said first and second slidable covers further comprise:
 (a) means mounting said covers for oblique movement between a first position wherein each cover is positioned over an associated elongated member for confining fuel pellets therein and a second position clear of said associated elongated member; and
 (b) cover actuators mounted on said apparatus for activating each said covers.

22. An apparatus for loading fuel rods with fuel pellets comprising:
 (a) dual elongated members having retractable pellet stops affixed thereto, and including actuator means therefor, each member mounted for movement between a first position for receiving a plurality of fuel pellets arranged in a row and for transferring said pellets and a second position for weighing said pellets;
 (b) a fuel rod indexer comprising a carousel having a plurality of longitudinally spaced holders each having circumferentially spaced recesses for receiving and supporting a plurality of fuel rods, and means for rotating said carousel to sequentially present fuel rods to a loading position;
 (c) a guide bushing assembly comprising dual input guide bushings, output guide bushings and intermediate tubular bushing members;
 (d) each said input guide bushings, output guide bushings, and intermediate tubular bushing members including longitudinal passageways in mutual coaxial alignment and with a fuel rod presented for loading by said carousel to assist the transfer of said fuel pellets into said fuel rods;
 (e) a guide bushing actuator to move said output guide bushings longitudinally to engage said fuel rods presented by said fuel rod indexer;
 (f) means to transfer said fuel pellets from each elongated member into said fuel rods comprising:
  (i) a push rod positioned in coaxial alignment with said passageways in said guide bushing assembly;
  (ii) a screw for effecting movement of said push rod;
  (iii) a reversible motor to rotate said screw;
  (iv) a motor control to energize said motor for advancing said push rod to push said fuel pellets into said fuel rod and to reverse said motor after insertion of said fuel pellets for retracting said push rod from said fuel rod;

(g) an encoder responsive to rotation of said screw for generating a predetermined number of pulses per revolution of said screw;

(h) means to determine the length of the row of fuel pellets being inserted comprising:
  (i) a light source positioned to emit light along a light path across the passageway in said output guide bushing;
  (ii) a photocell positioned to receive light from said light source;
  (iii) means responsive to interruption of said light path by fuel pellets being pushed through said passageway to initiate counting of pulses from said encoder;
  (iv) said push rod having a hole extending transversely therethrough at a predetermined distance from the end of said push rod for reestablishment of said light path to terminate counting of said pulses;
  (v) means for determining from the number of pulses counted the distance traveled by said push rod between interruption and re-establishment of said light path and for subtracting said predetermined distance to determine the length of said row of fuel pellets being inserted; and (i) means for determining the length of the predetermined space remaining in the fuel rod loaded with fuel pellets, said means comprising:
  (i) means for causing said push rod to move forward into said fuel rod until forward movement is blocked;
  (ii) a photocell developing a signal to initiate counting of said pulses from said encoder upon establishment of said path when said transverse hole in said push rod passes said light source;
  (iii) means to terminate counting of said pulses when forward movement of said push rod is blocked;
  (iv) means responsive to blocking of said push rod to command said motor control to reverse the movement of said push rod; and
  (v) means for determining from the number of pulses counted the length of the space remaining with said loaded fuel rod.

* * * * *